(12) United States Patent
Graham et al.

(10) Patent No.: US 10,022,723 B2
(45) Date of Patent: Jul. 17, 2018

(54) METHOD AND APPARATUS FOR PREVENTING BUILDUP OF TWINE AND NETWRAP ON THE ROTOR OF A BALE PROCESSOR

(75) Inventors: Lucas B. Graham, New Sharon, IA (US); Shaun M. Riveland, Bismarck, ND (US); Philip D. Stam, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 1114 days.

(21) Appl. No.: 14/349,704

(22) PCT Filed: Oct. 31, 2011

(86) PCT No.: PCT/US2011/058514
§ 371 (c)(1),
(2), (4) Date: Apr. 4, 2014

(87) PCT Pub. No.: WO2013/066287
PCT Pub. Date: May 10, 2013

(65) Prior Publication Data
US 2014/0239106 A1 Aug. 28, 2014

(51) Int. Cl.
*B02C 13/04* (2006.01)
*A01F 29/00* (2006.01)
*B02C 13/26* (2006.01)

(52) U.S. Cl.
CPC ............ *B02C 13/04* (2013.01); *A01F 29/005* (2013.01); *B02C 13/26* (2013.01)

(58) Field of Classification Search
CPC ........ B02C 13/04; B02C 13/26; A01F 29/005

USPC .............................. 241/605, 189.1, 191, 194
See application file for complete search history.

(56) References Cited

U.S. PATENT DOCUMENTS

| 2,026,790 | A | * | 1/1936 | Mankoff | B02C 13/28 |
| | | | | | 241/194 |
| 3,179,420 | A | * | 4/1965 | Schultz | A01C 3/066 |
| | | | | | 172/553 |
| 3,675,696 | A | | 7/1972 | Weichel | |
| 5,071,079 | A | | 12/1991 | Fykse | |

(Continued)

OTHER PUBLICATIONS 6 pages—showing a Degelman Bale King—from a website.
(Continued)

*Primary Examiner* — Jessica Cahill
*Assistant Examiner* — Joseph Finan, Jr.
(74) *Attorney, Agent, or Firm* — Sturm & Fix LLP

(57) ABSTRACT

A bale processor of a type having flail rotor providing an outer support surface with a plurality of flails mounted thereon are mounted for movement therewith around a flail rotor axis for engaging the bale and removing material from the outside of the bale. A plurality of depth control bars are disposed between adjacent flails for controlling the distance that the outer end of the flails extend into the outer surface of the bale. In one embodiment the depth control bars are positioned close to the outer support surface of the flail rotor whereby the depth control bars prevent a buildup of twine or netwrap on the outer support surface of the flail rotor. In another embodiment engagement members rigidly attached to the frame, separate from the depth control bars, are disposed between flails for preventing a buildup of netwrap/twine on the flail rotor.

8 Claims, 23 Drawing Sheets

(56) References Cited

U.S. PATENT DOCUMENTS

| | | | | |
|---|---|---|---|---|
| 5,207,391 A * | 5/1993 | Anderson | B02C 18/067 |
| | | | | 241/186.4 |
| 5,368,238 A * | 11/1994 | Bergkamp | A01F 29/005 |
| | | | | 241/223 |
| 5,482,562 A | 1/1996 | Abernathy | | |
| 5,503,339 A * | 4/1996 | Doppstadt | B02C 13/04 |
| | | | | 241/166 |
| 5,535,954 A | 7/1996 | Hudson et al. | | |
| 5,570,849 A | 11/1996 | Anderson | | |
| 5,813,616 A * | 9/1998 | Vandervalk | A01F 29/005 |
| | | | | 241/101.76 |
| 5,865,589 A * | 2/1999 | Reyher | A01F 29/005 |
| | | | | 241/101.742 |
| 6,109,553 A | 8/2000 | Hruska | | |
| 6,375,104 B1 | 4/2002 | Hruska | | |
| 6,578,784 B1 | 6/2003 | Lischynski | | |
| 6,708,911 B2 | 3/2004 | Patterson | | |
| 6,711,824 B2 * | 3/2004 | Hruska | A01F 29/005 |
| | | | | 30/294 |
| 6,886,763 B2 | 5/2005 | Lepage | | |
| 7,581,691 B2 | 9/2009 | Helmeczi | | |
| 8,066,208 B2 * | 11/2011 | Bennett | A01F 29/005 |
| | | | | 241/186.3 |
| 8,628,036 B2 * | 1/2014 | Jackson | B02C 13/04 |
| | | | | 241/101.761 |
| 2003/0061926 A1 * | 4/2003 | Sotsky | B02C 18/145 |
| | | | | 83/495 |
| 2004/0238665 A1 | 12/2004 | Howard | | |
| 2005/0205706 A1 * | 9/2005 | Lepage | A01F 29/005 |
| | | | | 241/30 |
| 2006/0086857 A1 | 4/2006 | Lepage | | |

OTHER PUBLICATIONS 2 pages—brochure showing a Haybuster 2800 Balebuster—dated Feb. 2005.

13 pages—International Search Report and Written Opinion from corresponding PCT application.

7 pages—of the International Preliminary Report on Patentability from a corresponding PCT application.

* cited by examiner

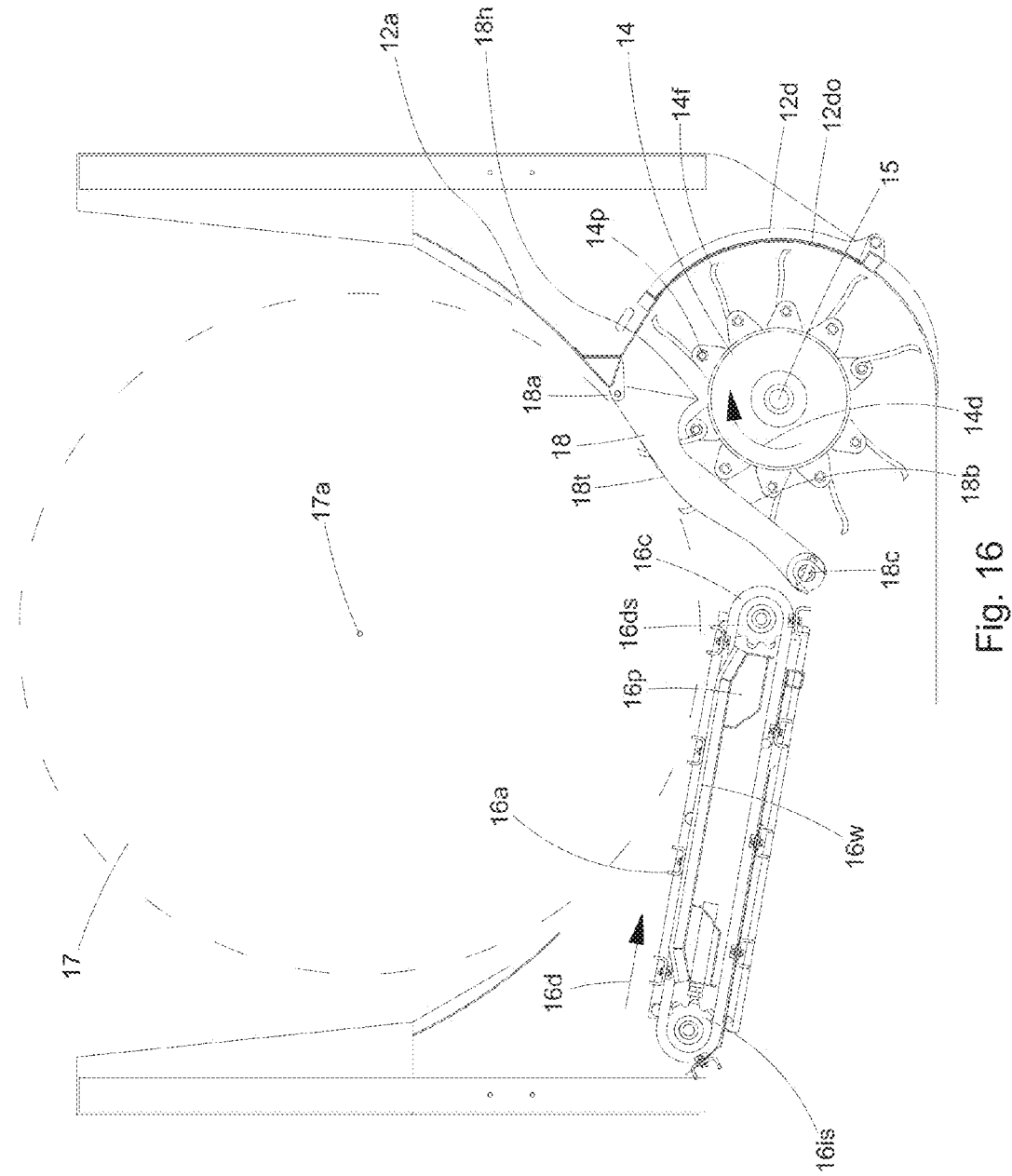

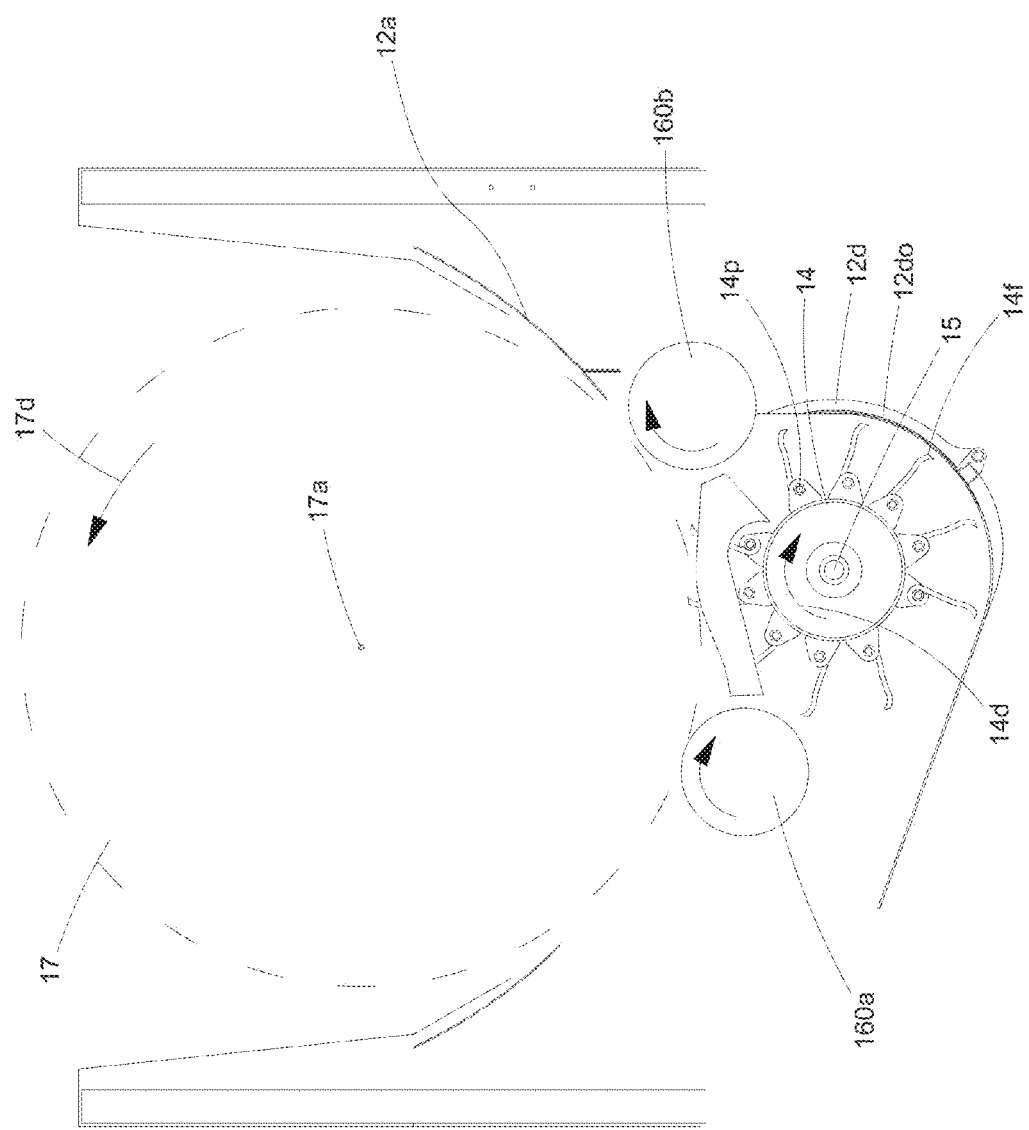

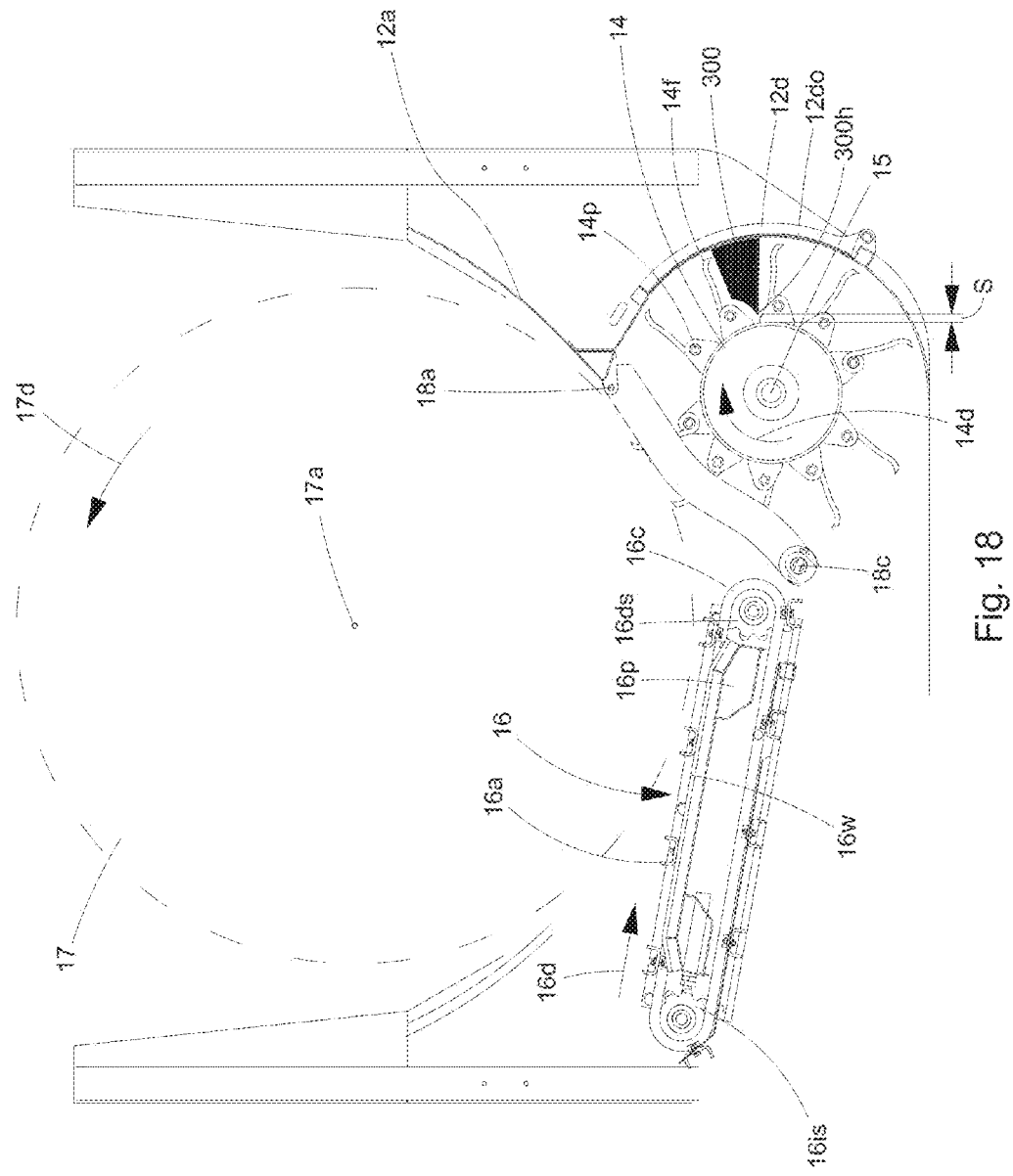

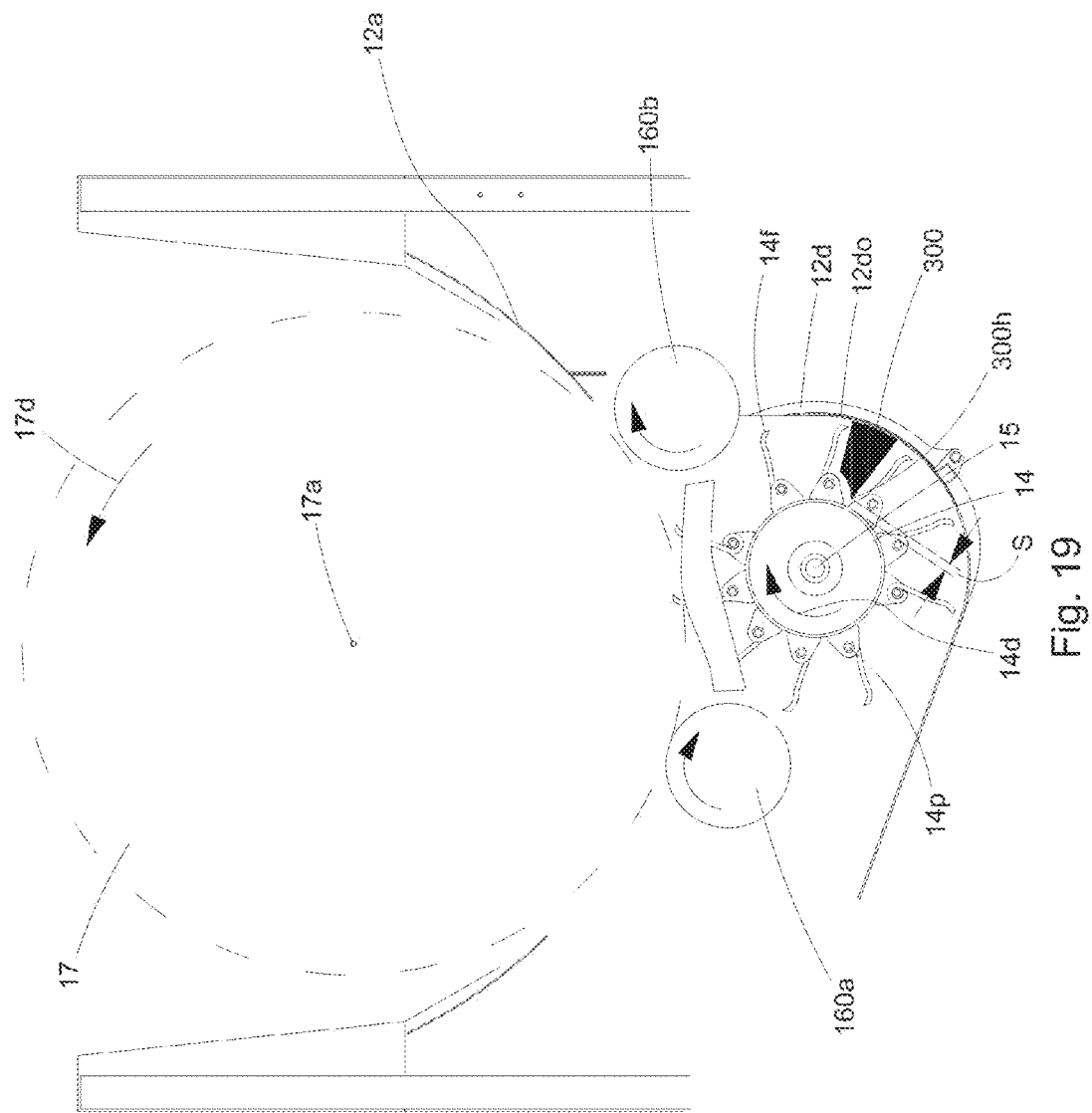

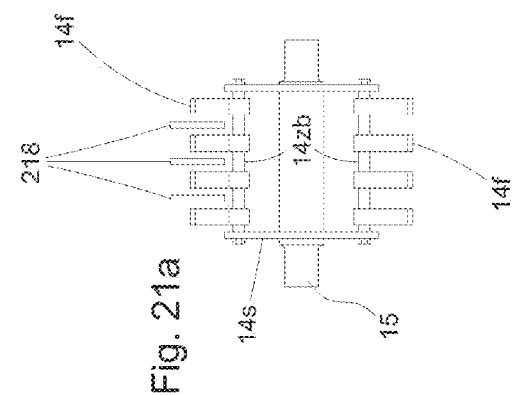
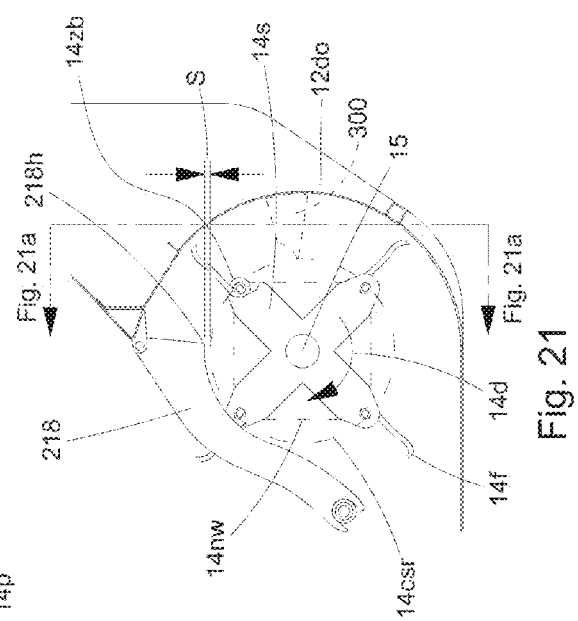
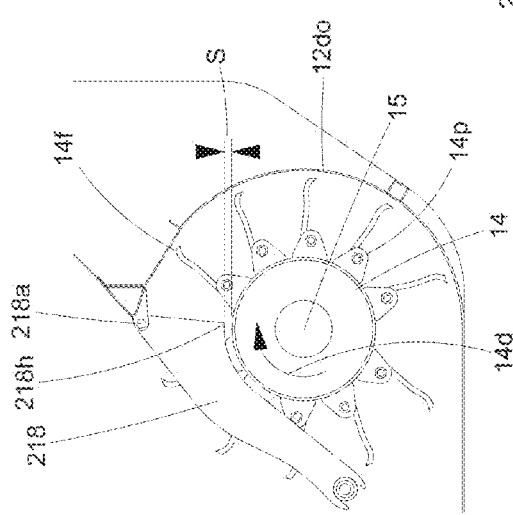

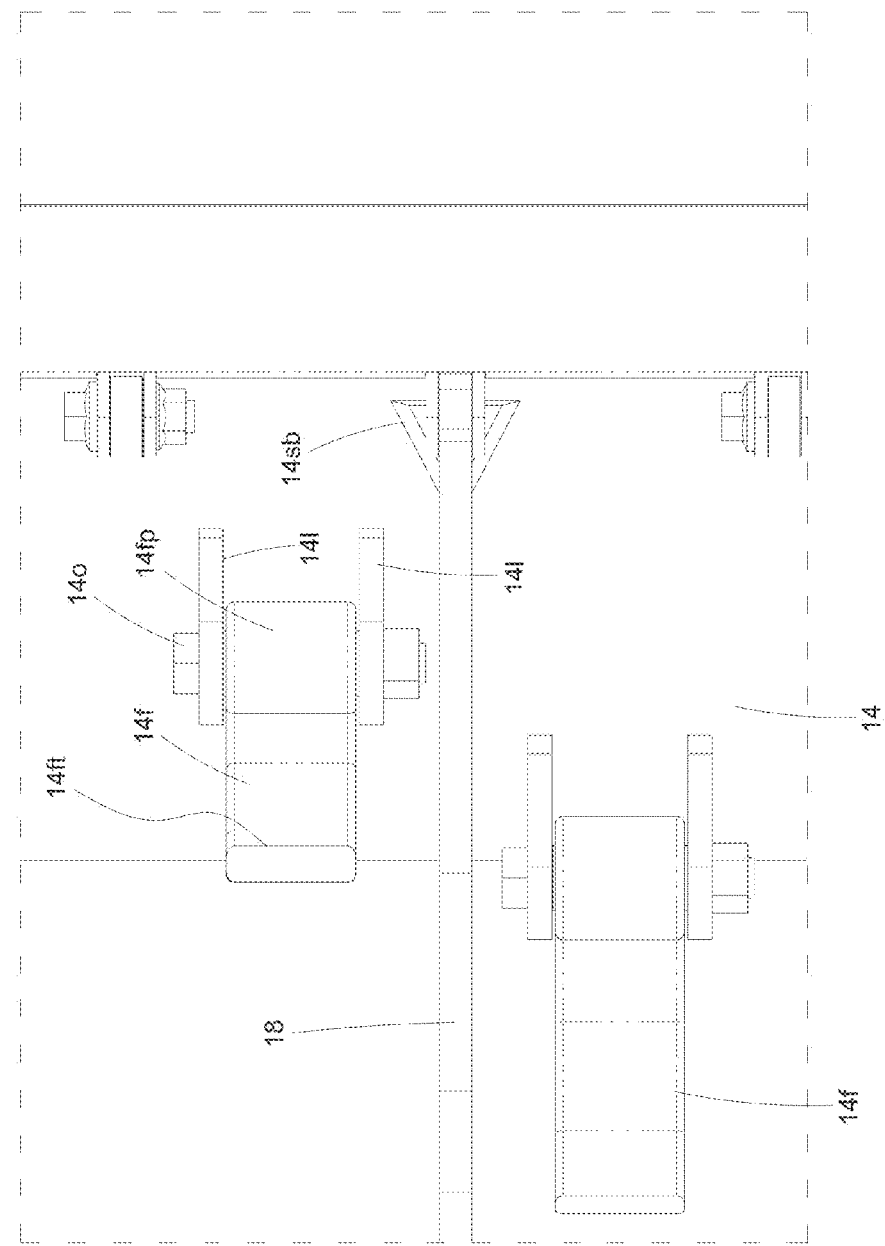

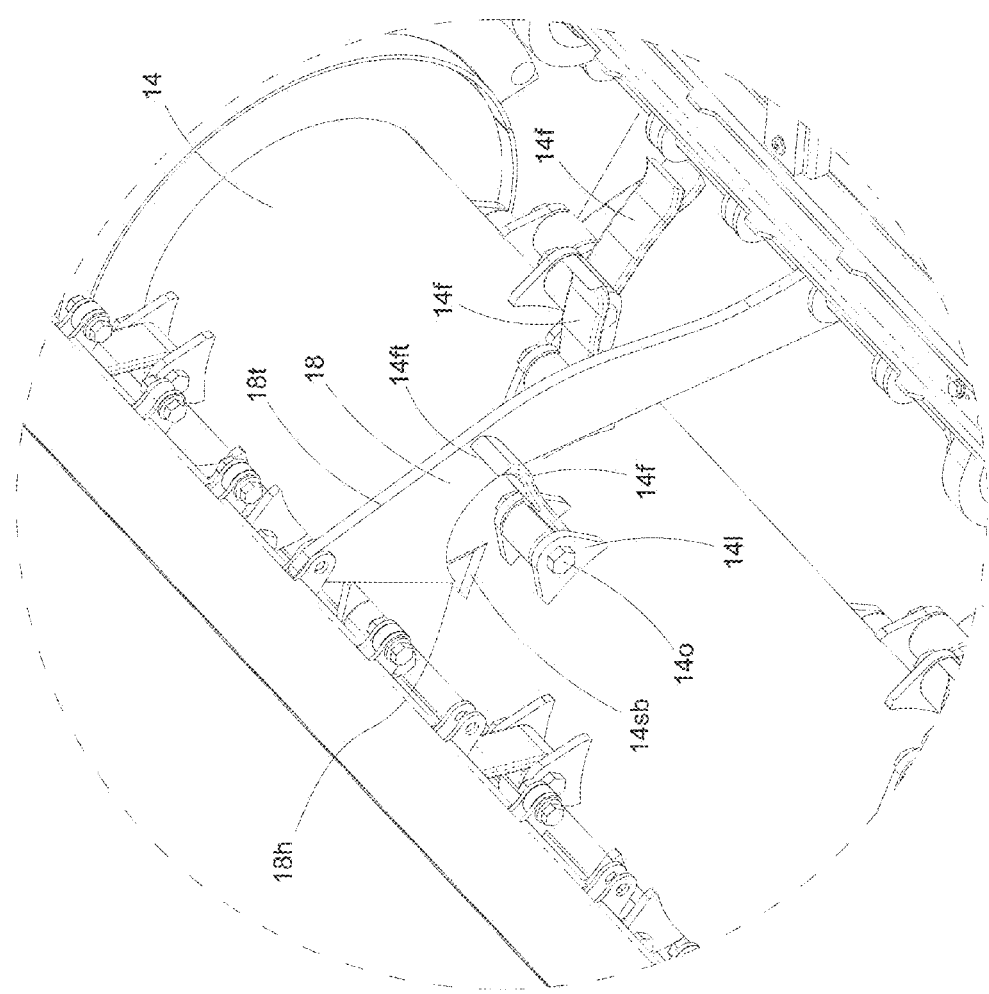

ms of FIGS. 1-16;

METHOD AND APPARATUS FOR PREVENTING BUILDUP OF TWINE AND NETWRAP ON THE ROTOR OF A BALE PROCESSOR

TECHNICAL FIELD

This invention relates generally to bale processors and more particularly to a method and apparatus for preventing the buildup of twine and/or netwrap on the rotor of a bale processor.

BACKGROUND

Bale processors are devices used to spread the content of bales of forage in a controlled way for reasons such as mulching or feeding livestock. Examples of bale processors are shown in U.S. Pat. No. 6,708,911 to Patterson et al., U.S. Pat. No. 6,711,824 to Hruska, U.S. Pat. No. 6,578,784 to Lischynski et al., U.S. Pat. No. 6,886,763 to Lepage et al., U.S. Pat. No. 7,581,691 to Helmeczi et al. and Published U.S. Patent Application No. 2006/0086857 to Lepage et al., all of which are incorporated herein by reference in their entirety.

These bale processors typically have a cylindrical rotor rotor with hammers or flails pivotally attached thereto along the outside of the rotor. As the rotor rotates, the hammers/flails hit the outside of a bale, causing those outside portions of the bale to be separated from the bale and then thrown out of the bale processor to the ground.

Since bales of forage typically have twine or netwrap on the outside thereof for holding them together, this twine/netwrap is the first thing the hammers/flails hit when a new bale is introduced into the hopper of a bale processor. But instead of throwing all of the twine/netwrap out of the bale processor, a significant amount of the twine/netwrap wraps around the rotor and stays there between adjacent hammers/flails. The more the twine/netwrap builds up on the rotor, the less effective the hammers/flails are in removing forage from the outside of the bale.

This problem of the twine/netwrap was recognized in U.S. Pat. No. 6,886,763 to Lepage et al and was dealt with by periodically using a specially designed spear shaped knife to cut the twine/netwrap from the rotor. While this is one way to deal with the problem, it requires stopping/starting and manual labor to use the knife to clean the rotor.

Accordingly, a more efficient and automatic method and apparatus for preventing twine/netwrap from building up on the rotor of a bale processor is needed.

BRIEF DESCRIPTION OF THE DRAWINGS

The above needs are at least partially met through provision of the method and apparatus described in the following detailed description, particularly when studied in conjunction with the drawings, wherein:

FIG. 16 is a front schematic view through the center of the hopper that is quite similar to the FIG. 8 view;

FIG. 17 is is a front schematic view through the center of the hopper that is quite similar to the FIG. 16 view only it shows an alternate embodiment using rotors to rotate the bale instead of a chain conveyor like the earlier embodiments of FIGS. 1-16;

FIG. 18 shows an embodiment similar to the embodiment of FIGS. 10-12, except instead of using the depth control bars to keep the netwrap/twine from building up on the rotor/drum separate members disposed between the hammers 14f of the rotor/drum serve that purpose independently of the position of the depth control bars;

FIG. 19 shows an embodiment similar to the embodiment of FIGS. 10-12, except (1) instead of using the depth control bars to keep the netwrap/twine from building up on the rotor/drum separate members disposed between the hammers 14f of the rotor/drum serve that purpose independently of the position of the depth control bars and (2) the bale is rotated using the rotors that are also shown in FIG. 17 instead of the chain conveyor of the earlier shown embodiments;

FIG. 20 shows the spacing between the rotor and the rotor/drum;

FIG. 21 shows that the hammers 14f do not need to be mounted on a rotor/drum but can be just attached to the end of structural elements 14s that are rotatably mounted about shaft 15;

FIG. 21a is a view of the rotor taken along line 21a-21a—of FIG. 21;

FIG. 23 is an enlarged top elevational view of the embodiment of FIG. 22 showing the sickle blade section under a depth control bar and also showing two of the many spaced apart flails on the flail rotor; and FIG. 24 is a perspective view of the embodiment of FIGS. 22 and 23 showing the sickle blade section, one of the depth control bars and portions of the rotor with the flails attached thereto.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
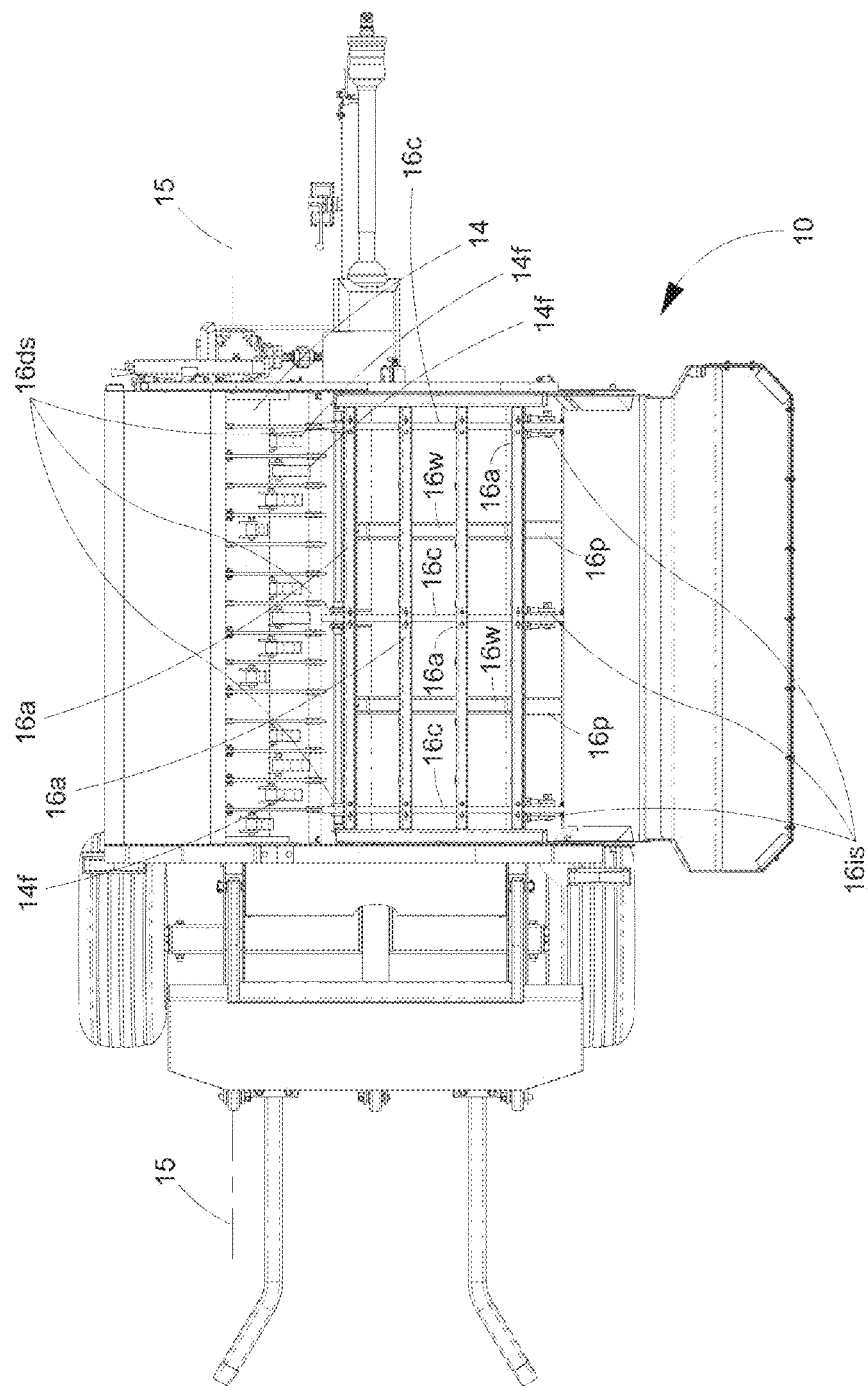
FIG. 1 is a top plan view of a preferred embodiment of the bale processor of the present invention.
Figure 2:
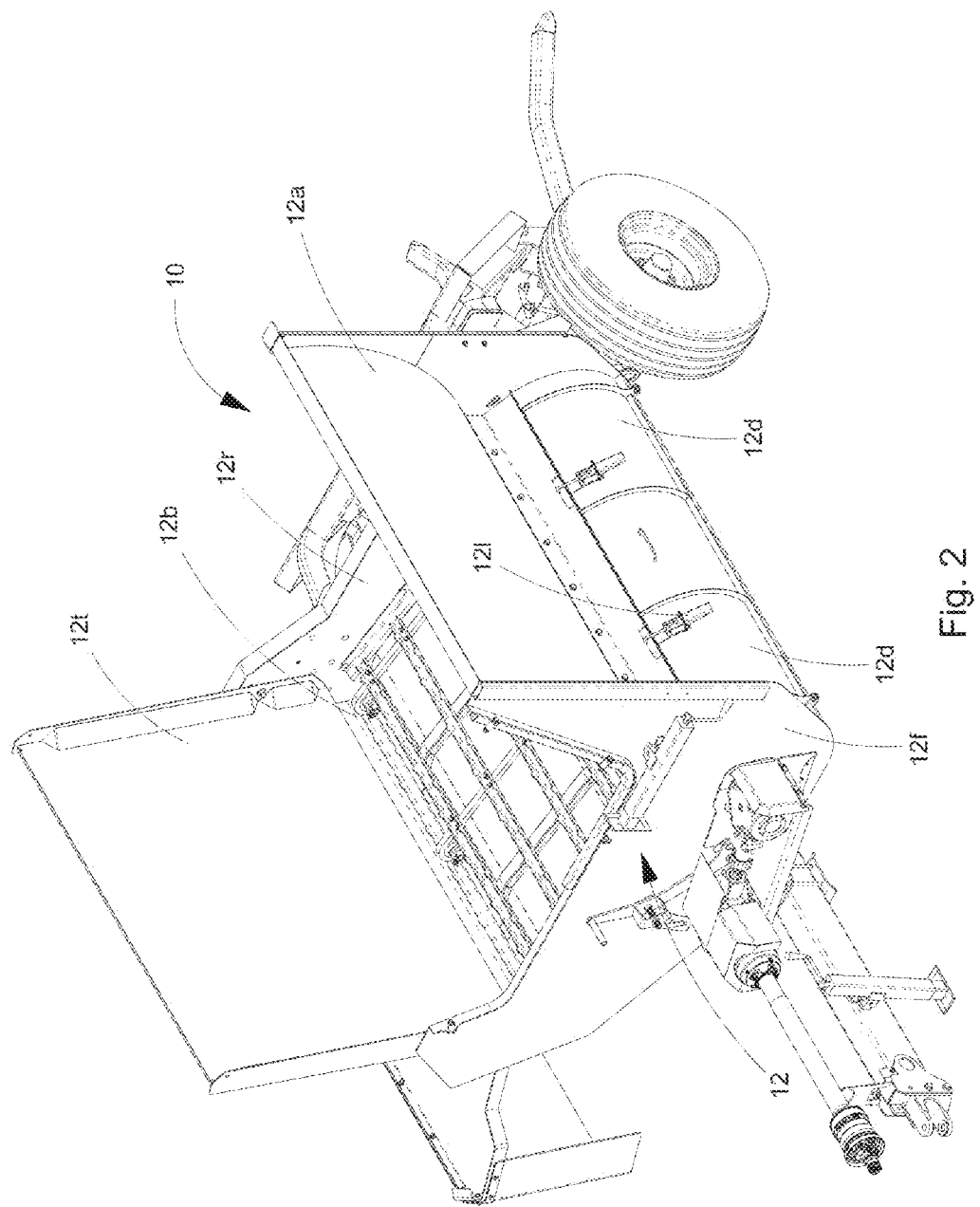
FIG. 2 is a perspective view of the bale processor of FIG. 1.

Referring now to the drawings, wherein like reference numerals indicate identical or similar parts throughout the several views, FIGS. 1 and 2 show a bale processor 10 constructed in accordance with a preferred embodiment of the invention.

Figure 3:
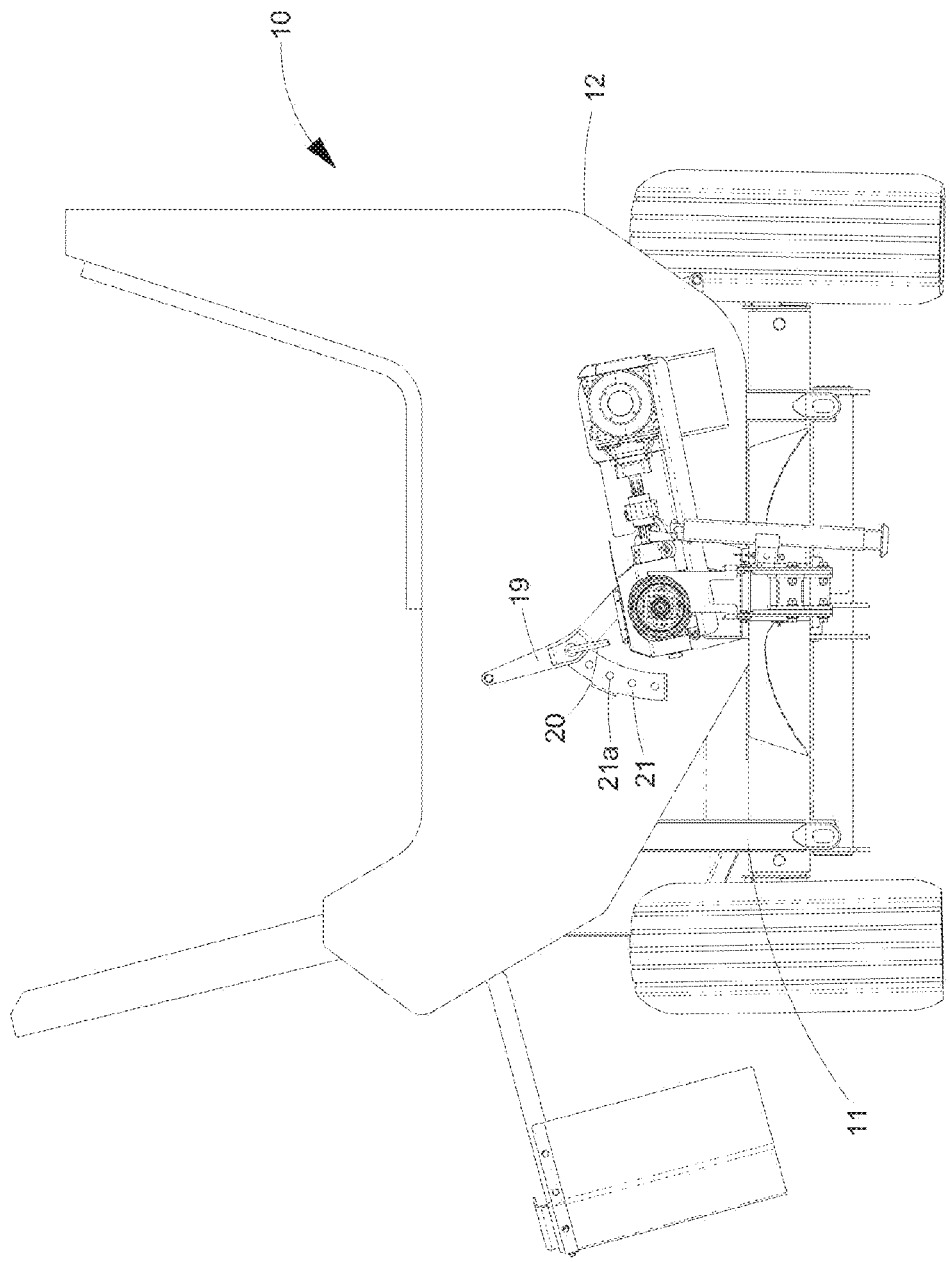
FIG. 3 is a rear elevational view of the bale processor of FIGS. 1 and 2.
Figure 4:
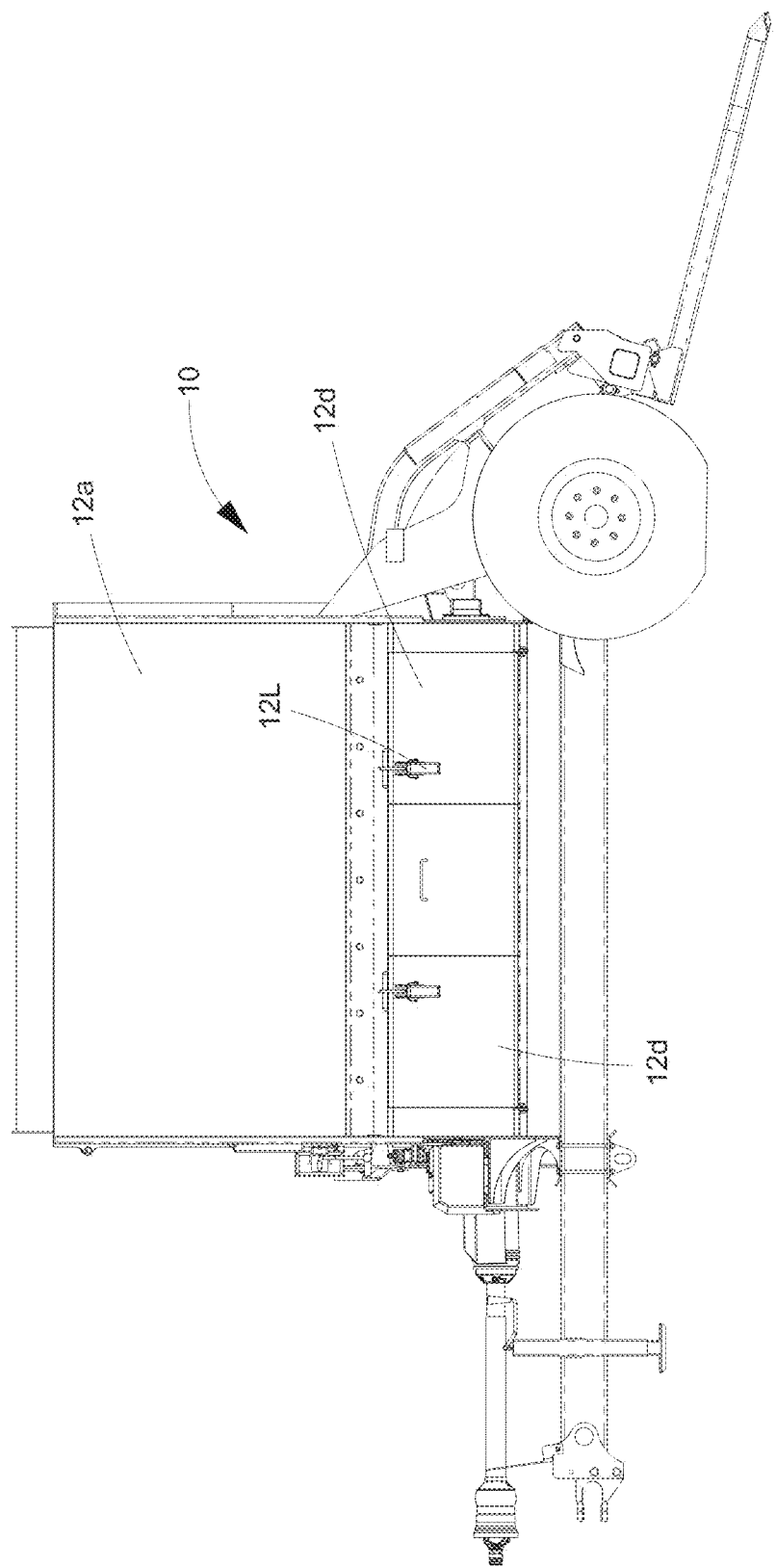
FIG. 4 is a side elevational view of the bale processor of the present invention.

The bale processor 10 has a frame 11 as shown in FIG. 3, connecting a hopper 12 to the frame 11 for receiving a bale (not shown) to be processed. The hopper 12 has two side walls 12a/12b and two end walls, 12f/12r arranged to define an open top through which the bale is loaded when a pivoted top 12t is in the open position as shown in FIG. 2. The two side walls 12a/12b converge inwardly and downwardly to a lower disintegration area 13 (See FIG. 7). A flail rotor 14 is mounted in the disintegration area and rotatable about an axis 15, extending generally along the side wall 12b and transverse to the end walls 12f/12r. The flails 14 are preferably flails like those shown in FIG. 24 with the outer cutting edge leading the rest of the flail when it rotates because this type of flail tend to throw the material, which action is desired in a bale processor. The rotor 14 and flails 14f of this invention are like those disclosed in U.S. Pat. No. 7,581,691, column 1, starting at line 45. An example of such a typical flail disintegrator for a bale processor is illustrated in FIGS. 1-24 and is also described in U.S. Pat. No. 6,109,553 issued on Aug. 29, 2000 to Hruska, which is incorporated herein by reference. The flail disintegrator 11 includes a cylindrical shaped rotor 14 having a substantially circular cross-section. A number of flails 14f are pivotally mounted on the flail rotor 14. The flails 14f are intermittently spaced along the length and symmetrically spaced around the circumference of the rotor 14 for balance. Each flail 14f is made from a solid metal bar having a rectangular cross-section and, in this example, is reverse bent at two points. One end of each flail 14f is welded to a hollow cylindrical section for pivotally mounting by a bolt to a support or tab 6 that is welded to the rotor 14. The other, radially outer, end of flail 114f is beveled to provide a cutting or tearing edge.

Figure 7:
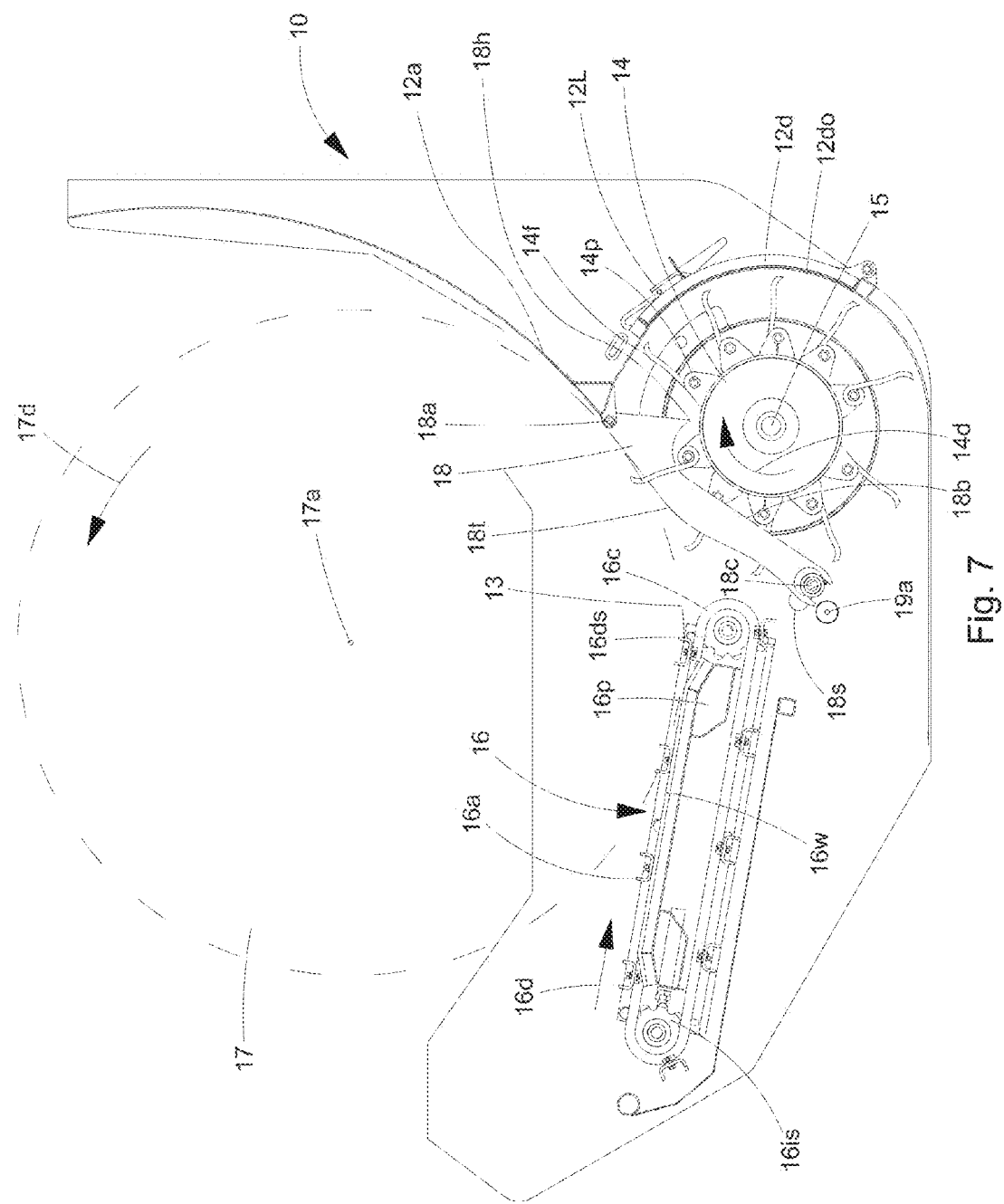
FIG. 7 is a front schematic view of the hopper with the front sheet metal part of the hopper removed so as to show the position of other depth control bars in the same position as they are shown in FIG. 6.
Figure 8:
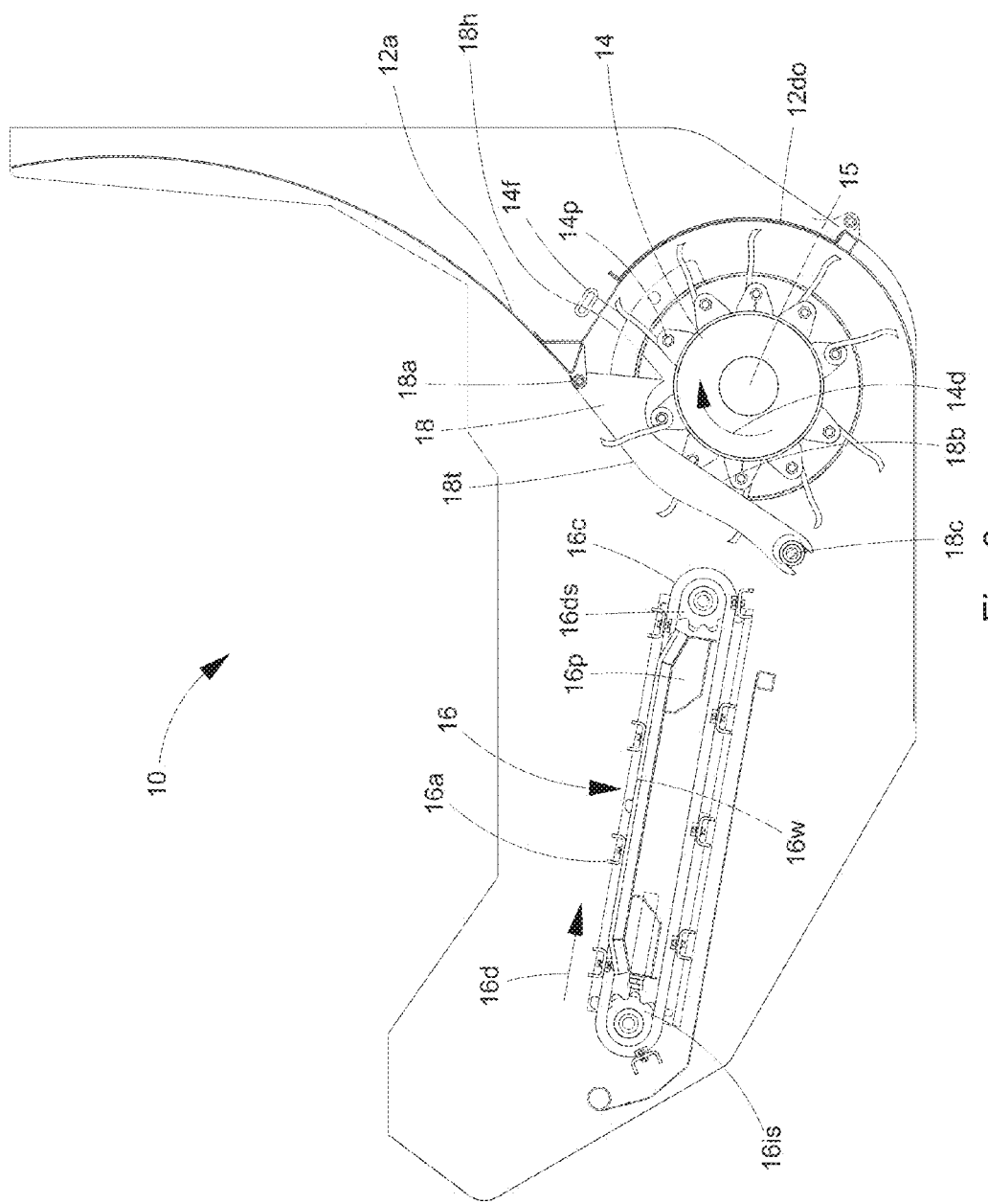
FIG. 8 is a front schematic view through the center of the hopper that is quite similar to the FIG. 7 view.

FIG. 7 shows a portion of a chain conveyor 16 positioned in the hopper 12 to rotate the bale 17 around an axis 17a (FIG. 7) that is generally parallel to the flail rotor axis 15. Chain conveyor 16 is powered by hydrostatically powered sprocket 16ds and idler sprocket 16 is that are positioned outside and below the hopper 12. Drive members 16a, supported by plate 16p and wear strips 16w, and attached to chains 16c, engage the bale, at the bottom of the hopper 12. Movement of the drive members 16a in the direction of arrow 16d result in rotation of the bale in direction 17d. The flail rotor 14 rotates in a direction 14d. The direction of movement of chain conveyor 16 can be reversed as may be required to accommodate variations in bale shape. Wear strips 16w are supported on metal plates 16p disposed at the bottom of the hopper 12.

The flail rotor 14 providing an outer support surface with a plurality of flails 14f pivotally mounted thereon along axes 14p for movement therewith around the flail rotor axis 15 for engaging the bale 17 and removing material from the outside thereof due to the flails 14f above the spacer bars 18 coming in contact with the outer part of the bale 17. Some of the flails 14f are spaced apart along the flail rotor axis 15 as can best be seen in FIG. 1. The rotor 14 is like U.S. Pat. No. 7,581,691 to Helmeczi et al., and the flails 14f are preferably cup shaped like those shown in U.S. Pat. No. 7,581,691 to Helmeczi et al., which has been incorporated herein by reference in its entirety.

One of the side walls 12a has a discharge opening 12 do at the disintegration area 13 for discharge of the material removed from the bale 17 by the flail rotor flails 14f from the disintegration area 13. The discharge opening 12 do has a door 12d which can optionally be held closed with latches 12L when the bale processor 10 is not in use.

Figure 5:
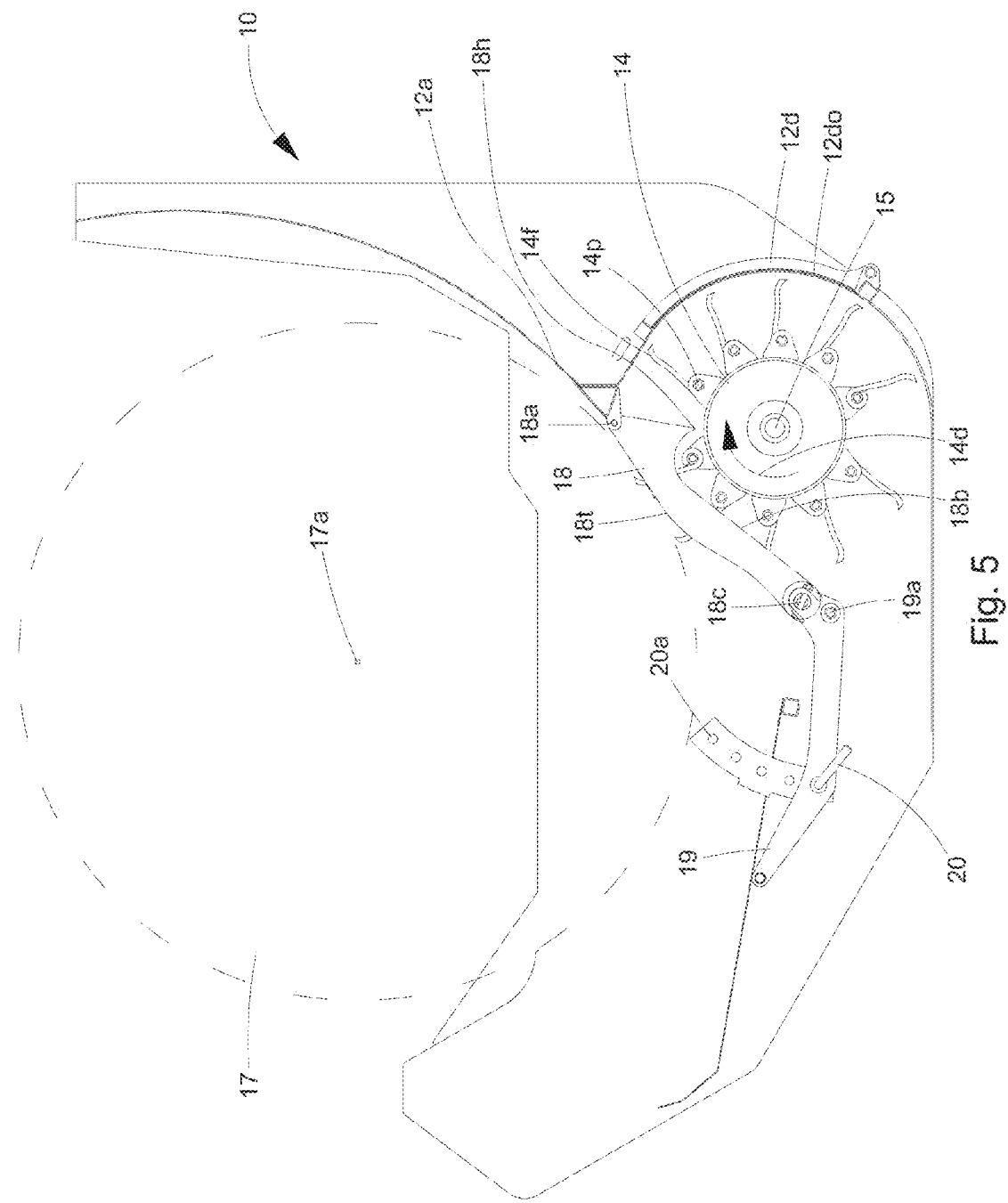
FIG. 5 is a rear elevational schematic view with the rear sheet metal panel of the hopper removed to show the working parts inside of one embodiment of the slug bars/depth control bars in one pivotal position thereto illustrating the adjustment arm in the lowest position, rotated about the adjustment pivot, which causes the slug bar to rotate clockwise as the adjustment arm is being moved downward, pivoting about the slug bar pivot and in this position the upper surface of the slug bar holds the bale away from the rotor at the maximum separation distance, where the distance from the centerline of the rotor to the upper surface of the slug bar is at a maximum.
Figure 6:
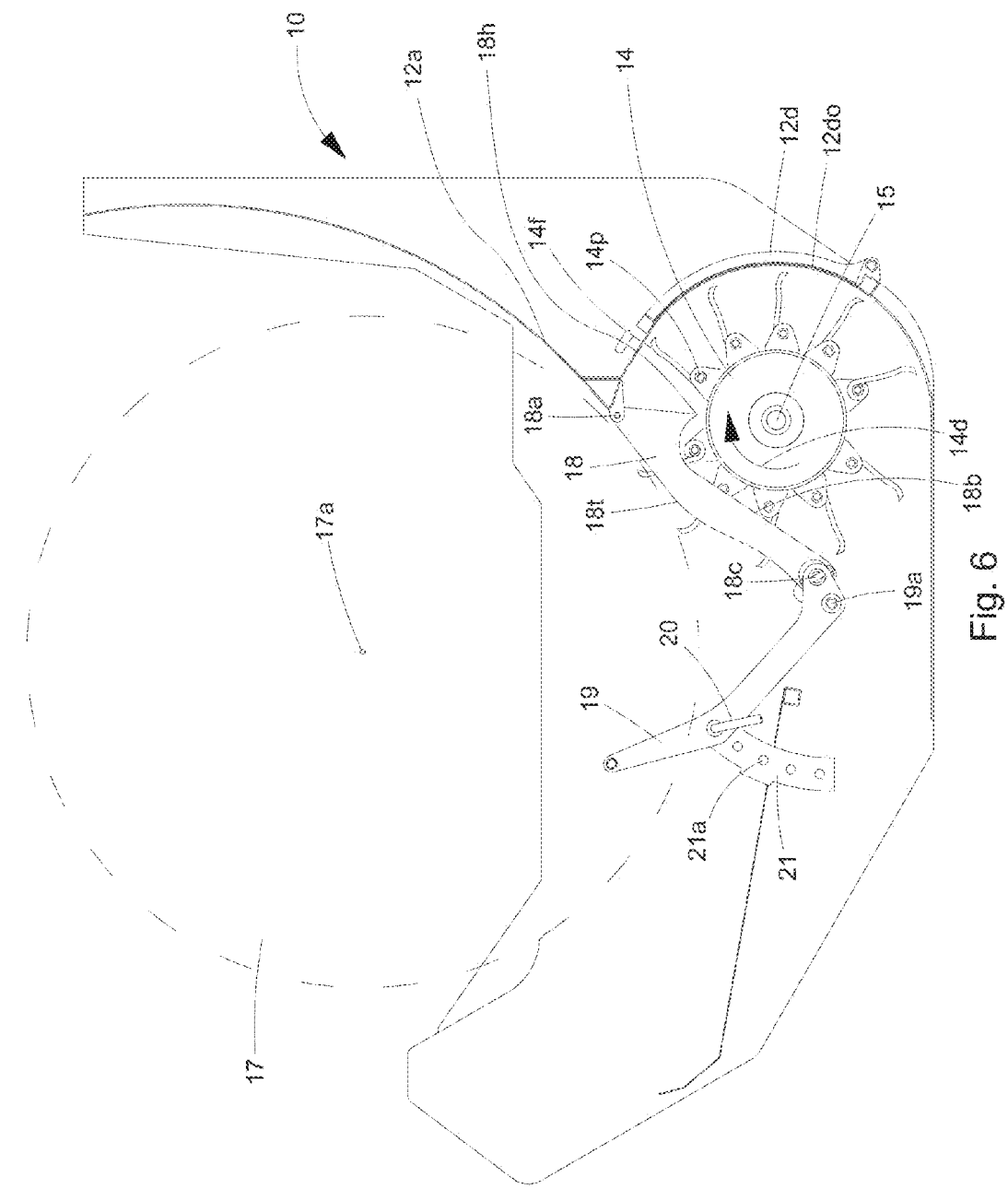
FIG. 6 is a rear elevational view like FIG. 5 but showing the slug bars/depth control bars in another pivotal position thereof where the hammers/flails on the rotor stick up farther above the top of the depth control bars so as to take bigger chunks of hay from the bale than in the position shown in FIG. 5, FIGS. 5 and 6 both showing how close the pointed part of the lower part of the depth control bar is to the outer surface of the cylindrical rotor, FIG. 6 also illustrating the adjustment arm in the highest position, rotated about the adjustment pivot, which causes the slug bar to rotate, counter-clockwise as the adjustment arm is being moved upward, pivoting about the slug bar pivot and in this position the upper surface of the slug bar holds the bale away from the rotor at the minimum separation distance, i.e. where the distance from the centerline of the rotor to the upper surface of the slug bar is at a minimum.

A plurality of depth control bars/slugs 18 are pivotally attached at the top end by bolts 18c, the depth control bars/slugs 18 being disposed between adjacent flails 14f for controlling the distance that a radially outer end of the flails 14f extend into the outer surface of the bale 17 as can be seen by comparing the different distance that the flails 14f extend above the depth control bars 18 in FIG. 5 as compared to how far the flails 14f extend above the depth control bars 18 in FIG. 6. Attention is directed to the fact that the changes in the pivotal position of the depth control bars 18 between FIGS. 5 and 6 are changed by moving the control/slug bar adjustment arm 19 about its pivot axis 19a, thereby pivoting the depth control bars 18 about pivot point axis 18a and moving the bottom of depth control bars 18 at bar 18c in slot 18s (FIG. 7). A pin 20 is used to lock the control bar adjustment arm 19 in one of five positions corresponding to the holes 21a in member 21 which is fixed with respect to the frame 11. Notice that in FIG. 5 the pin 20 is in the lowest hole 21a of member 20 and that in FIG. 6 the pin 20 is in the top hole 21a of the member 21.

While the rotor 14 is shown rotating in a counterclockwise direction in FIGS. 5-12, it could rotate in an opposite direction, for example if it was desired to throw the extracted parts of the bale out the other side of the bale processor 10 instead of out the side shown.

The depth control bars 18 having a side closest to the flail rotor axis 18b and a side 18t farthest from the flail rotor axis 15. The depth control bars 18 have a first position close to the outer support surface of the flail rotor 14 that the plurality of flails 14f are mounted on and the depth control bars 18 have a second position farther from the outer support surface of the flail rotor 14 that the plurality of flails are mounted on whereby the side 18b of the depth control bars 18 closest to the outer support surface of the flail rotor 14 tends to prevent the buildup of twine and/or netwrap on such outer support surface of flail rotor 14.

Looking to FIGS. 5-8, it is noted that the end 18h of a hook shaped portion of depth control bars 18 is closest to the outer surface of the flail rotor 14, so that any twine or netwrap that might tend to build up above point 18h on the outer surface of rotor 14 hits the hook shaped portion at 18h and is cut into pieces that quickly exit through the discharge opening 12 with the other forage from the bale 17. In actual operation, it turns out somewhat surprisingly that most twine or netwrap that is between the point 18h and the outer part of the rotor 14 tends to be shed from the rotor 14 as well.

The new designed depth control bar is designed to run closer to the skin of processing rotor between 0.10-1.75 inches for a functional range, noting that not as much net/twine would be shed in the upper range. The optimum appears to be in the 0.25-1.00" range with 0.75 appearing to be ideal. This creates a catch point between end 18h of the depth control bars 18 for the material on the rotor 14 and causes netwrap or twine between the two parts to be ejected with the processed material. The geometry of the mounting points is such that the catch point between point 18a and the rotor 14 remains constant through the range of depth of cut adjustment.

FIGS. 5 and 6 are schematic views. They illustrate the slug bar adjustment arm and a slug bar as they are positioned relative to the rotor with the flails extended as they would be while the rotor is spinning.

FIG. 5 illustrates the adjustment arm 19 in the lowest position, rotated about the adjustment pivot 19a, which causes the slug bar 18 to rotate clockwise as the adjustment arm 19 is being moved downward, pivoting the slug bar 18 about the slug bar pivot 18a. In this position the upper surface 18t of the slug bar 18 holds the bale 17 away from the rotor 14 at the maximum separation distance, where the distance from the centerline 15 of the rotor 14 to the upper surface of the slug bar 18 is at a maximum.

FIG. 6 illustrates the adjustment arm 19 in the highest position, rotated about the adjustment pivot 19a, which causes the slug bar 18 to rotate, counter-clockwise as the adjustment arm 19 is being moved upward, pivoting about the slug bar pivot 18a. In this position the upper surface of the slug bar 18 holds the bale 17 away from the rotor 14 at the minimum separation distance, where the distance from the centerline 15 of the rotor 14 to the upper surface 18t of the slug bar 18 is at a minimum.

In both positions the inner surface of the slug bar 18 includes a feature, which in these figures is a hook-like structure 18h that is maintained at a substantially consistent spacing from the rotor 14 regardless of the pivoted position of the slug bar 18. This characteristic is important for the novel function of the slug bar 18, in keeping wrap material (netwrap or twine) from building-up excessively on the rotor 14.

Figure 9:
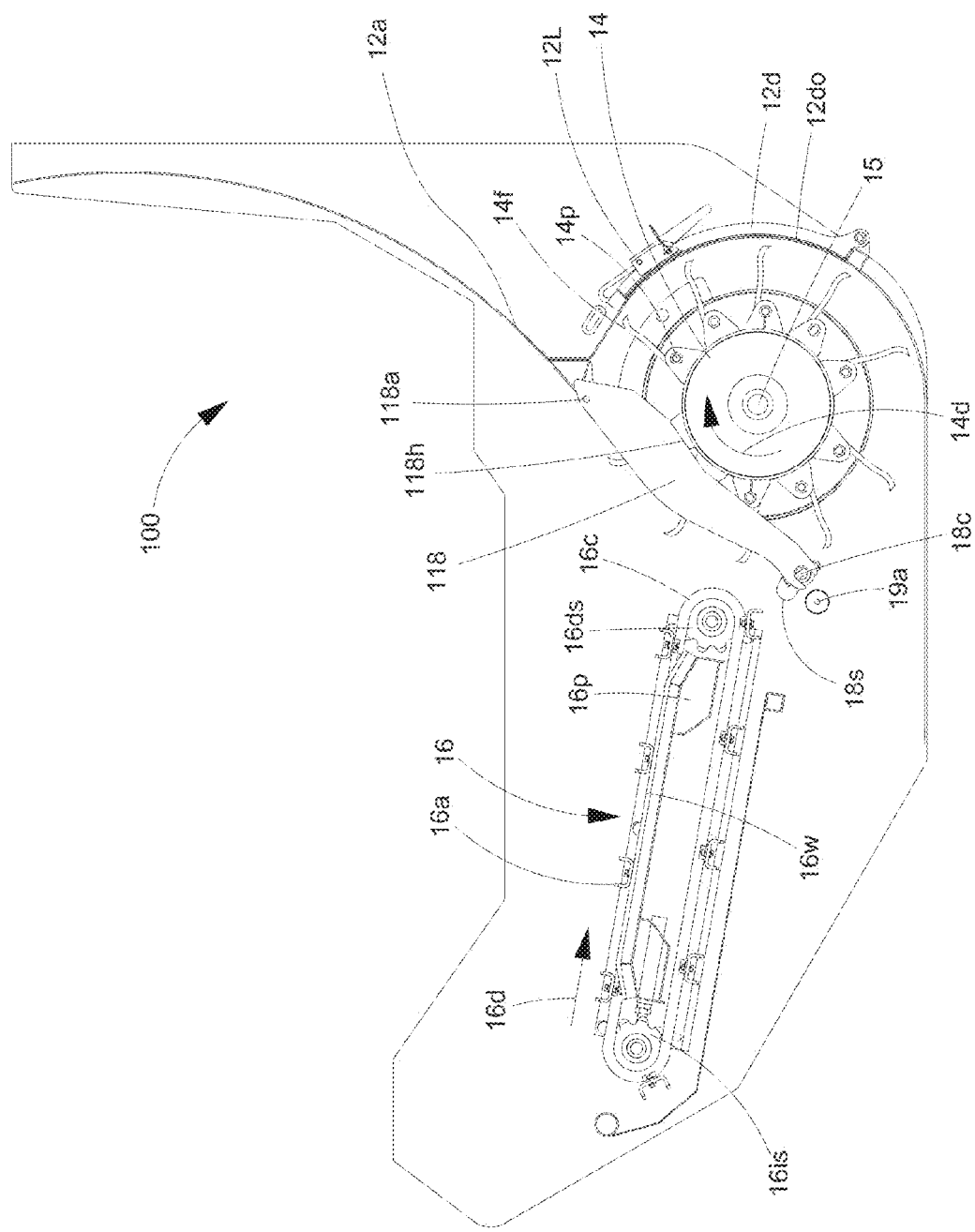
FIG. 9 is a view like FIG. 7, but showing a depth control bar of a different configuration as shown in FIGS. 10 and 14.
Figure 10:
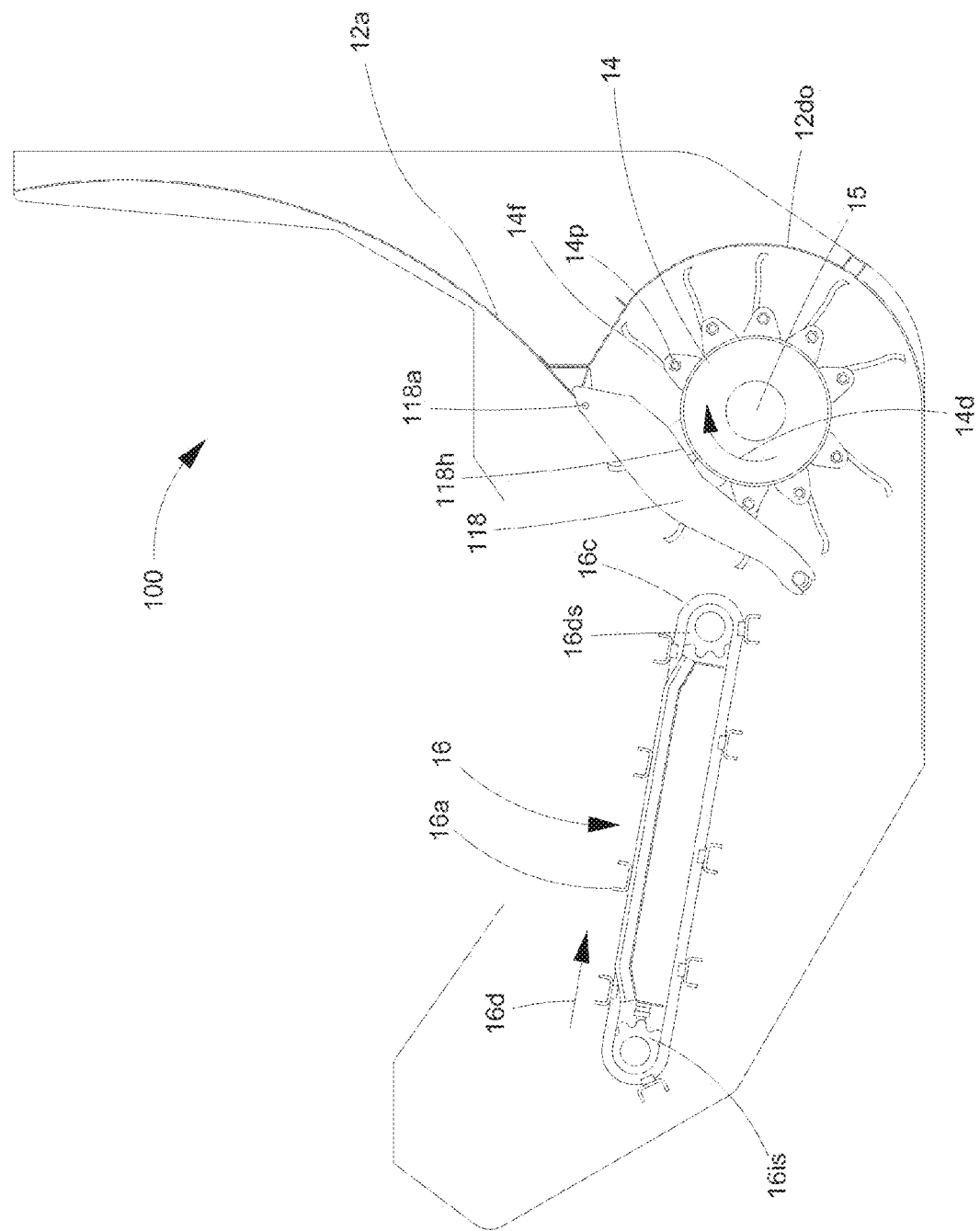
FIG. 10 is a view like FIG. 8, but with the depth control bar of FIGS. 7 and 14.
Figure 14:
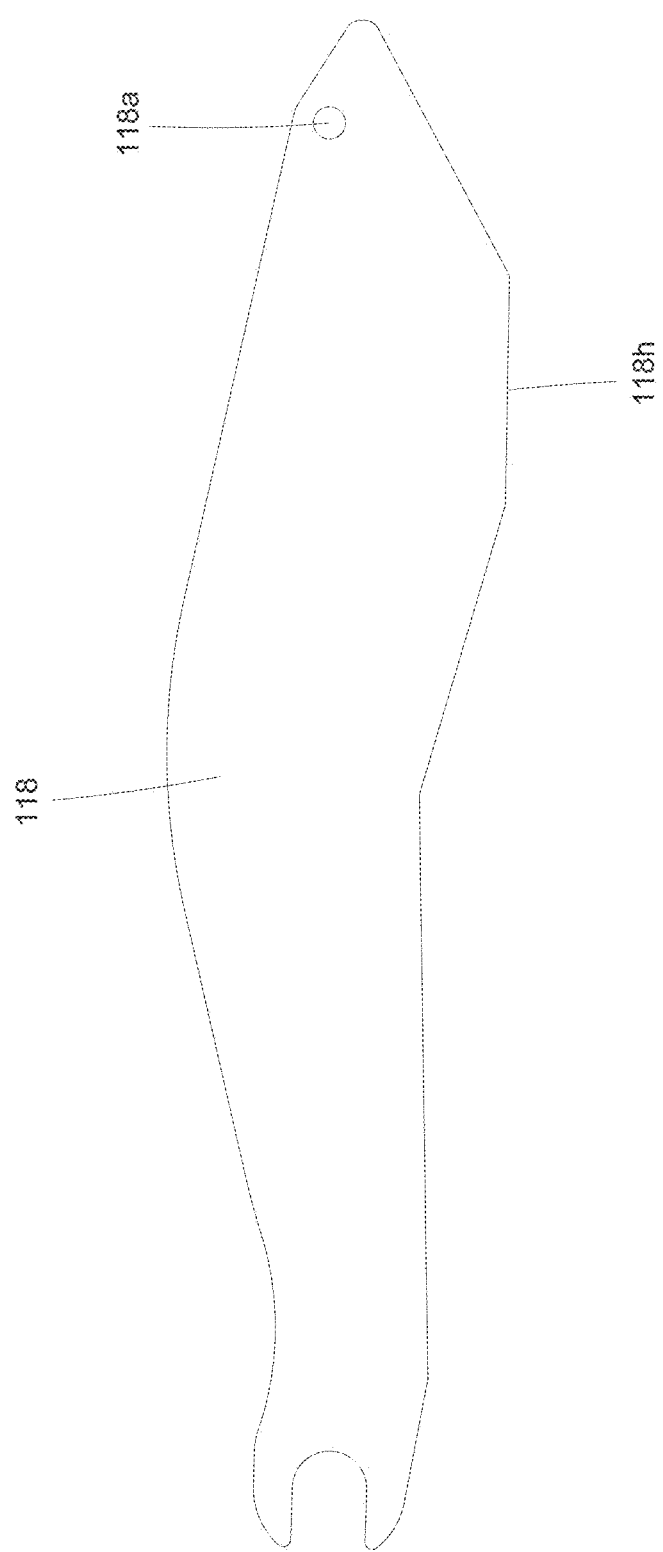
FIG. 14 is a side elevational view of the depth control bar of the embodiment of FIGS. 9 and 10.

The embodiment 100 of FIGS. 9, 10 and 14 works just like the embodiment of FIGS. 1-8 and 13, except the shape of the depth control bars 118 in the embodiment of FIGS. 9, 10 and 14 are different than the depth control bars 18 of FIGS. 1-8 and 13. It is approximately point 118h that corresponds to point 18h in the embodiment 10 of FIGS. 1-8.

Figure 11:
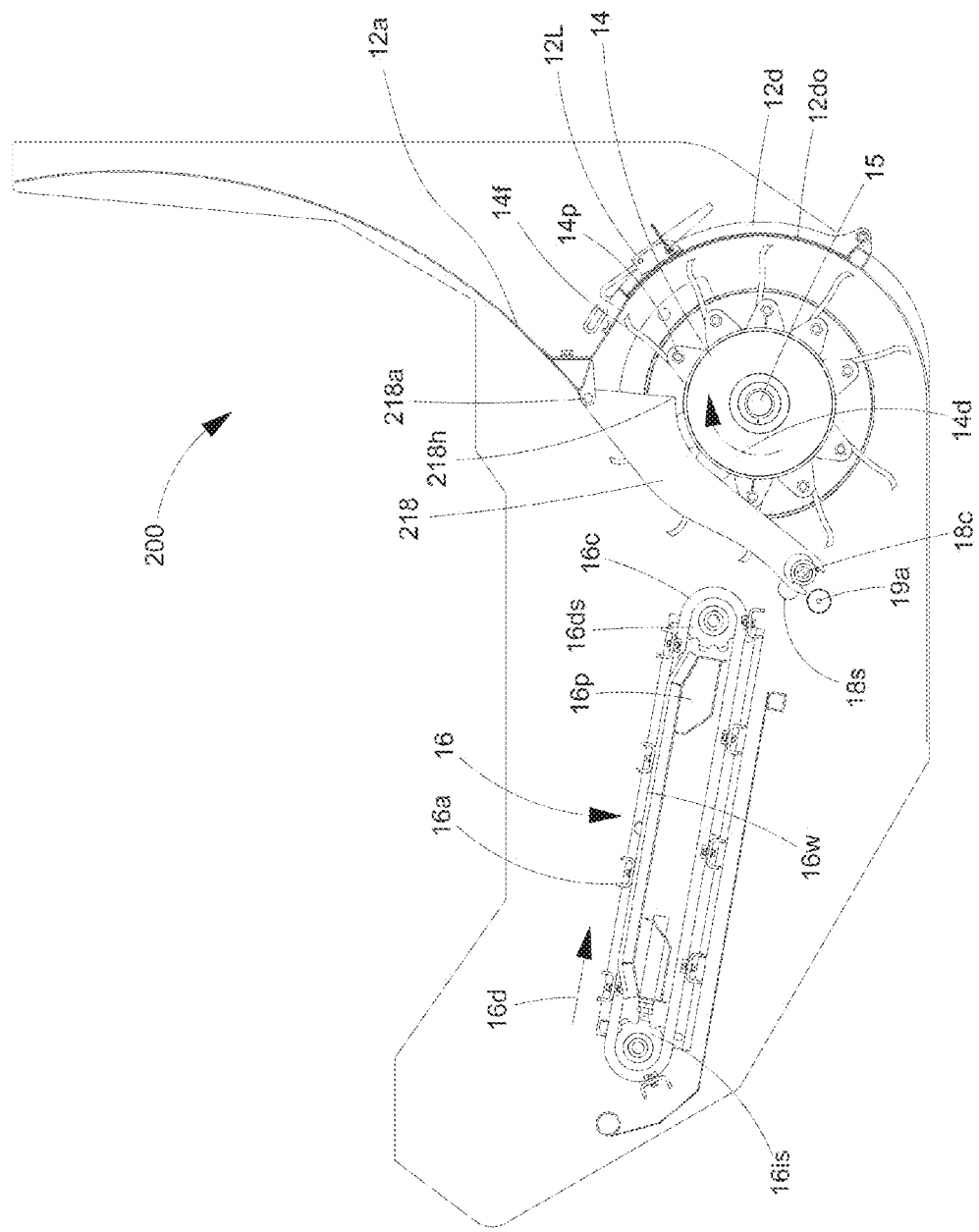
FIG. 11 is a view like FIGS. 7/9, but showing a depth control bar of a different configuration like that shown in FIG. 15.
Figure 12:
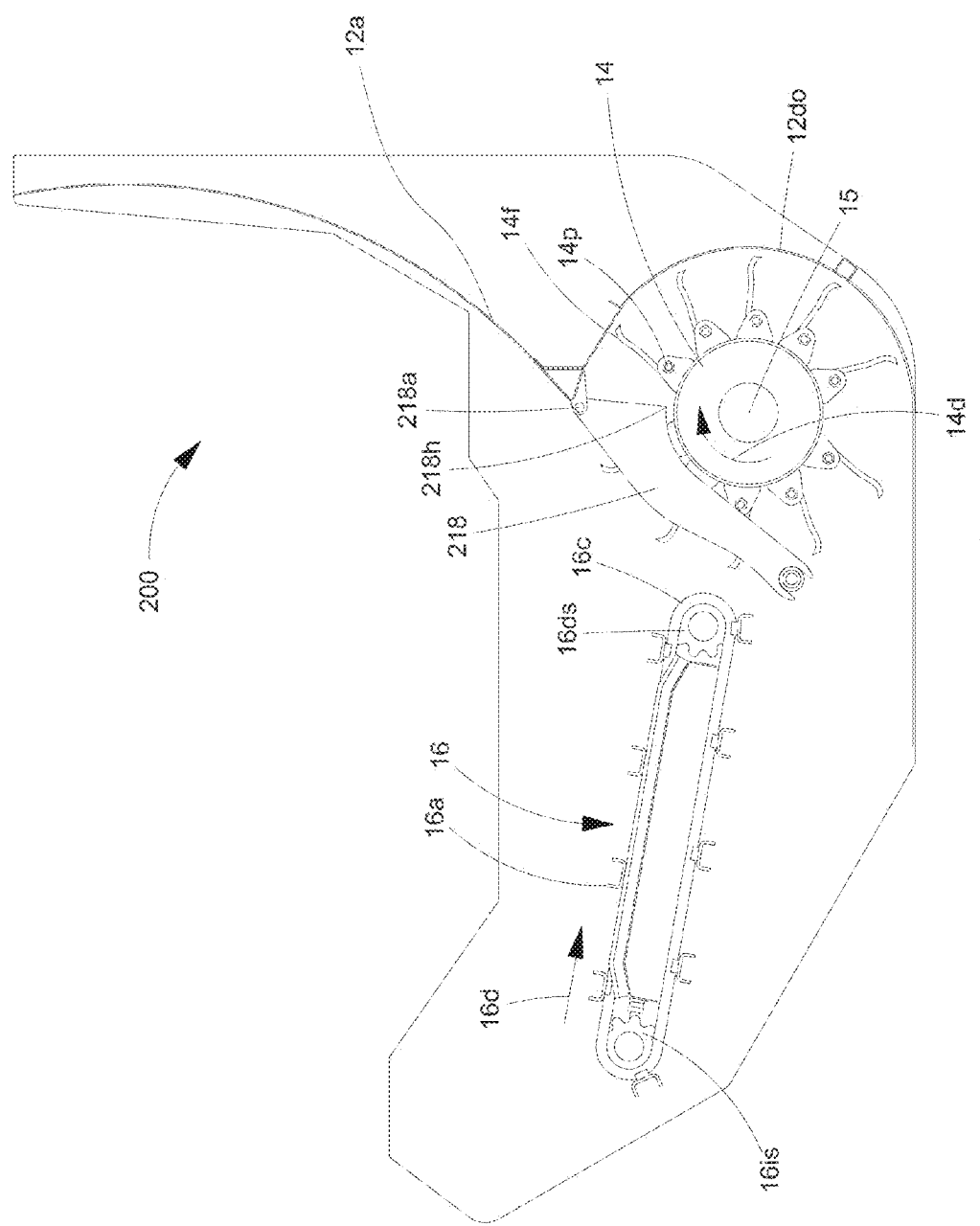
FIG. 12 is a view like FIG. 8/10, but with the depth control bar of FIGS. 11 and 15.
Figure 13:
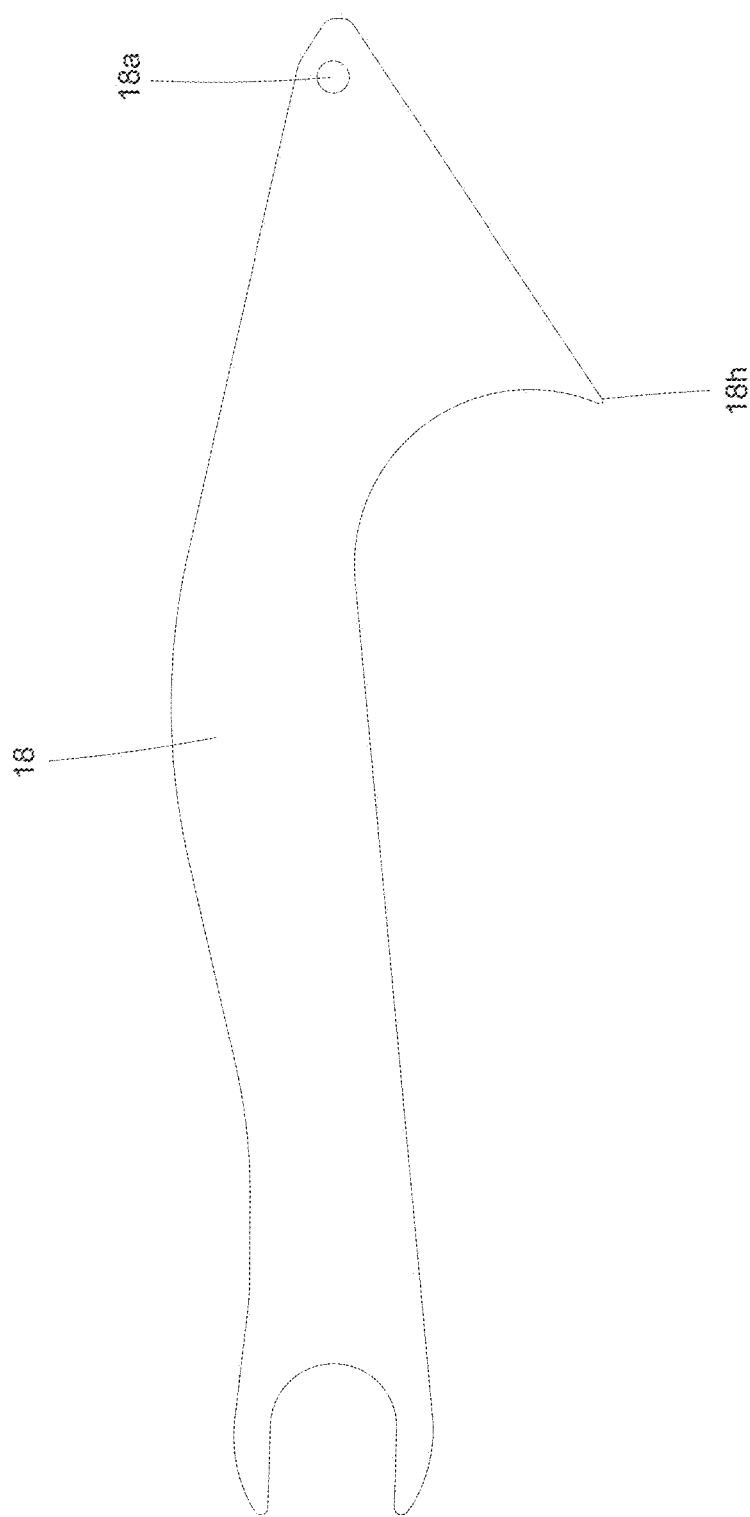
FIG. 13 is a side elevational view of the depth control bar of the embodiment of FIGS. 1-8.
Figure 15:
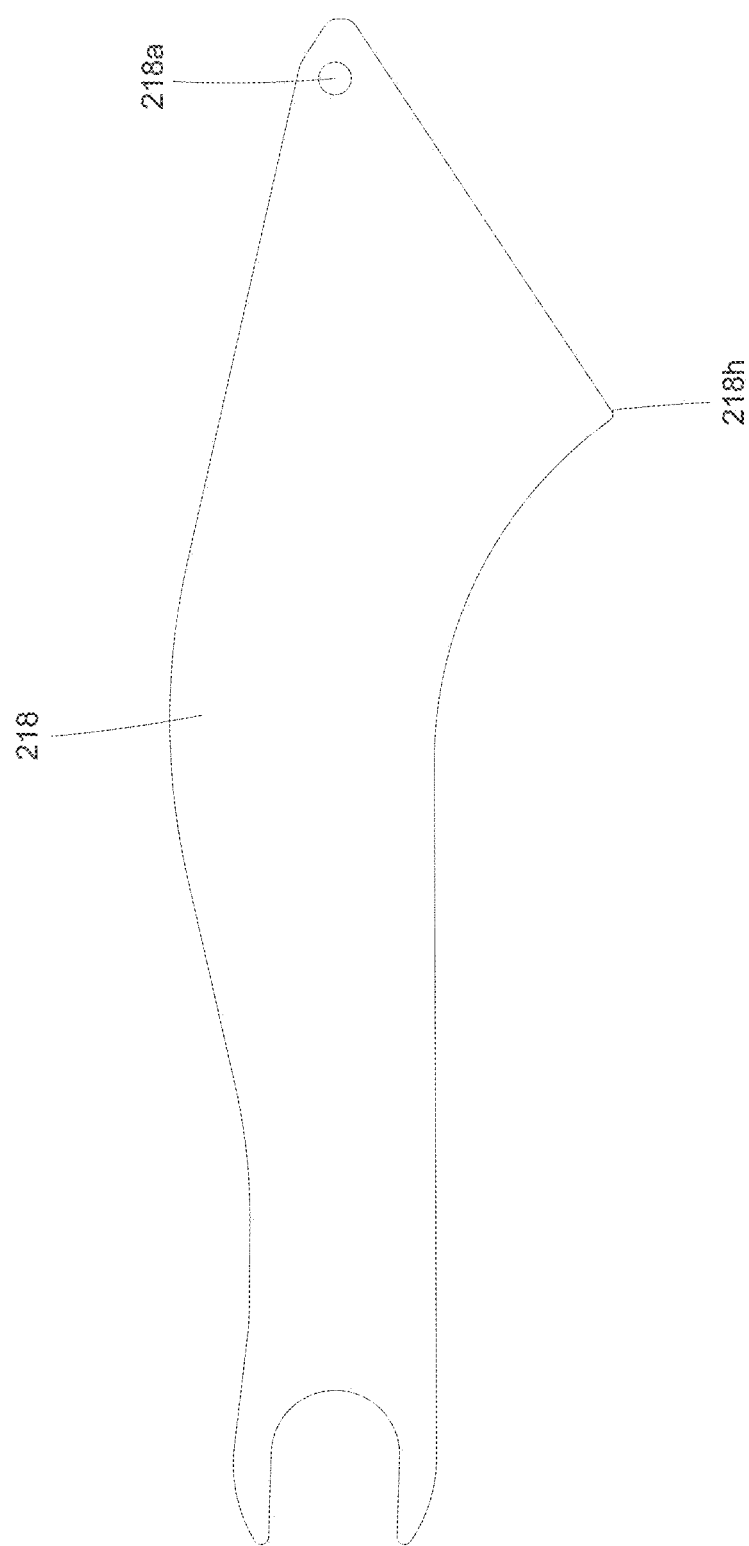
FIG. 15 is a side elevational view of the depth control bar of the embodiment of FIGS. 11 and 12.

The embodiment 200 of FIGS. 11, 12 and 15 works just like the embodiment of FIGS. 1-8 and 13, except the shape of the depth control bars 218 in the embodiment of FIGS. 9, 10 and 14 are different than the depth control bars 18 of FIGS. 1-8 and 13. It is approximately point 218h that corresponds to point 18h in the embodiment 10 of FIGS. 1-8.

FIG. 16 is a front schematic view through the center of the hopper 12. It is noted that the end 18h of a hook shaped portion of depth control bars 18 is closest to the outer surface of the flail rotor/rotor 14, so that any twine or netwrap that might tend to build up above point 18h on the outer surface of rotor 14 hits the hook shaped portion at 18h and is cut into pieces that quickly exit through the discharge opening 12 with the other forage from the bale 17. In actual operation, it turns out somewhat surprisingly that most twine or netwrap that is between the point 18h and the outer part of the rotor 14 tends to be shed from the rotor 14 as well.

FIG. 17 is a front schematic view through the center of the hopper 12 that is quite similar to the FIG. 16 view but it shows an alternate embodiment using rotors 160a and 160b to rotate the bale 17 about axis 17a in the direction 17d instead of using a chain conveyor like the earlier embodiments of FIGS. 1-16;

FIG. 18 shows an embodiment similar to the embodiment of FIGS. 10-12, except instead of using the depth control bars 18, 118, 218 to keep the netwrap/twine from building up on the rotor/drum separate members 300 disposed between the hammers 14f of the rotor/drum serve that purpose independently of the position of the depth control bars.

FIG. 19 shows an embodiment similar to the embodiment of FIGS. 10-12, except (1) instead of using the depth control bars 18, 118, 218 to keep the netwrap/twine from building up on the rotor/drum separate members 300 disposed between the hammers 14f of the rotor/drum serve that purpose independently of the position of the depth control bars and (2) the bale is rotated using the rotors 160a and 160b that are also shown in FIG. 17 instead of the chain conveyor of the earlier shown embodiments. The spacing S between the end 300h and the outer circumference of the rotor/drum 14 is preferably between 0.5 and 1.0 inches, 0.75 inches being found to be ideal under most circumstances. Member 300 can be made to be adjustable so it can be adjusted in the field for varying conditions.

FIG. 20 shows the spacing between the rotor and the rotor/drum which can be set permanently or can be adjustable.

FIG. 21 shows that the hammers 14f do not need to be mounted on a rotor/drum but can be just attached to the end of crossing structural elements 14s that are rotatably mounted about shaft 15. The spacing S is shown as the distance between the outer periphery of the circular path made by the outer ends of structural members 14s and the depth control bars point 218h.

Distance 14z is the outside surface of the drum 14 in FIGS. 1-20. 14csr is the cutting surface of rotation in FIGS. 20 and 21.

Distance 14zb is the horizontal surface bars that connect adjacent ends of rotor members 14s in FIG. 21.

Also shown in dashed lines is optional engagement members 300 that can be in addition to using the depth control bars 218 to shed netwrap/twine or instead of using the depth control bars 218 to be close enough to the rotor 14*s* to keep the netwrap/twine from building up on rotor part 15. The optional engagement members 300 can, if desired, extend radially inwardly enough to almost, but not quite, touch the outside of rotor shaft 15.

Figure 22:
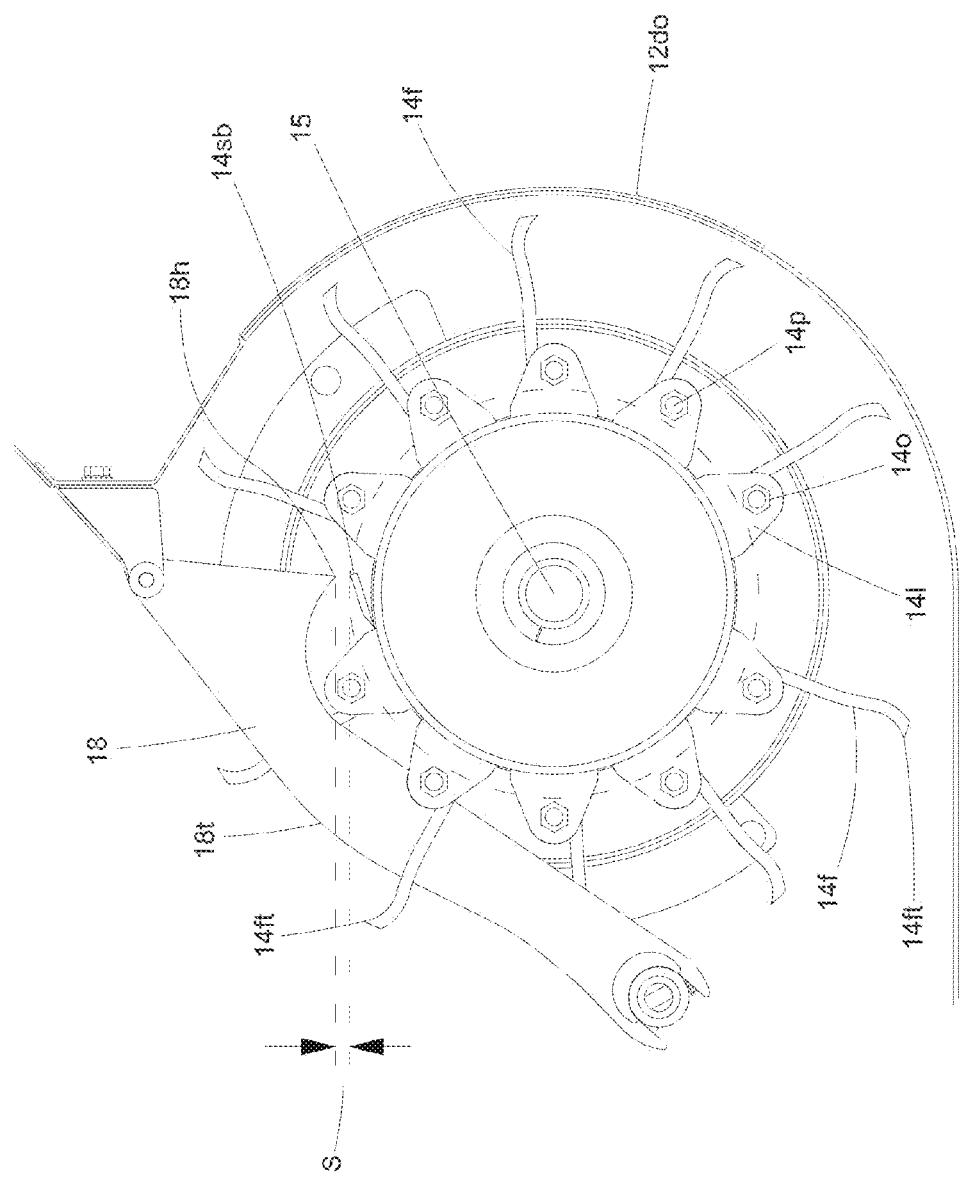
FIG. 22 shows an alternate embodiment wherein a sickle blade section is rigidly attached to the outside of the drum for helping to facilitate cutting of the netwrap/twine.

Referring now to another embodiment in FIGS. 22-23 a sickle blade section 14*sb* is rigidly attached to the outside of the drum 14 for helping to facilitate cutting of the netwrap/twine. The spacing S between the sickle blade 14*sb* and the point 18*h* on depth control bar 18 is between 0.10-1.75 inches.

In FIGS. 23 and 24 the sickle blade section 14*sb* is shown under a depth control bar 18 and also show two of the many spaced apart flails 14*f* on the flail rotor 14, noting that the flails 14*f* have a pivoting part 14*fp* and a sharpened tip 14*ft*. A bolt 140 extends through the pivoting part 14*fp* and through flanges 141 which are welded to the drum 14.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

We claim:

1. A bale processor comprising:
   a frame;
   a hopper operatively attached to the frame for receiving a bale to be processed, the hopper having two side walls and two end walls arranged to define an open top through which the bale is loaded;
   the two side walls converging inwardly and downwardly to a lower disintegration chamber;
   a rotor mounted in the disintegration chamber and rotatable about a rotor axis; the rotor having a plurality of flails mounted thereon for movement therewith around the rotor axis for engaging a bale and removing material therefrom, at least some of the flails being spaced apart along the rotor axis;
   at least one drive member in the hopper for driving rotation of the bale around an axis generally parallel to the flail device axis;
   a structure operatively attached to or being an integral part of the rotor between adjacent flails, a radially outermost portion of the structure between the adjacent flails passing through a circular path when the rotor is rotating; and
   a plurality of engagement members operatively attached to the frame and being disposed between said adjacent flails, with radially innermost portions of the plurality of engagement members being spaced (S) radially outwardly, with respect to the rotor axis, within 0.1 and 1.75 inches of the circular path of the radially outermost portion of the structure between the adjacent flails, the radially outermost portion of the structure between the adjacent flails being rigid; and
   wherein the plurality of engagement members have an inner edge closest to the rotor along a length of the engagement members and an outer edge farthest from the rotor along the length of the engagement members; and,
   wherein a part of the inner edge closest to the structure on the rotor extends to a tapered portion closer to the rotor than the rest of the inner edge, the tapered portion being within said 0.1 and 1.75 inches from said structure on the rotor.

2. The apparatus of claim 1 wherein the engagement members comprise plates disposed in the disintegration chamber, the plates being operatively rigidly attached to the frame.

3. The apparatus of claim 1 wherein the engagement members are part of or are attached to a plurality of depth control bars disposed between the adjacent flails.

4. The apparatus of claim 1 wherein the tapered portion is in the shape of a hook.

5. A bale processor comprising:
   a frame;
   a hopper operatively attached to the frame for receiving a bale to be processed, the hopper having two side walls and two end walls arranged to define an open top through which the bale is loaded;
   the two side walls converging inwardly and downwardly to a lower disintegration chamber;
   a flail device mounted in the disintegration chamber and rotatable about an axis extending generally along the side walls and transverse to the end walls; the flail device having a flail rotor;
   at least one drive member in the hopper for driving rotation of the bale around an axis generally parallel to the flail device axis;
   the flail rotor having a plurality of flails pivotally mounted thereon for movement therewith around the flail rotor axis for engaging the bale and removing material therefrom, some of the flails being spaced apart along the flail rotor axis; and
   a plurality of engagement members operatively attached to the frame and being disposed between adjacent flails whereby at least some netwrap and/or twine being moved by the flails will be moved into contact with the engagement members and wherein the distance between a radially inner end of the engagement members and the outer surface of the flail rotor is within a range of between 0.10 and 1.75 inches;
   wherein the plurality of engagement members have an inner edge closest to the rotor along a length of the engagement members and an outer edge farthest from the rotor along the length of the engagement members; and,
   wherein a part of the inner edge closest to the structure on the rotor extends to a tapered portion closer to the rotor than the rest of the inner edge, the tapered portion being within said 0.1 and 1.75 inches from said structure on the rotor.

6. The apparatus of claim 5 further comprising a plurality of depth control bars disposed between adjacent flails.

7. The apparatus of claim 6 wherein the distance (S) that a radially outer end of the flails extends into an outer surface of the bale is adjustable by adjusting the depth control bars.

8. The apparatus of claim 5 wherein the tapered portion is in the shape of a hook.

* * * * *